US012322392B1

(12) United States Patent
DiLeo et al.

(10) Patent No.: US 12,322,392 B1
(45) Date of Patent: Jun. 3, 2025

(54) AUTOMATED SYSTEM AND METHOD THAT SERVICES INQUIRING VESSELS

(71) Applicant: TDI Novus, Inc., Philadelphia, PA (US)

(72) Inventors: Nicholas DiLeo, Longview, WA (US); Adam Blenk, Philadelphia, PA (US); Thomas Mirowski, Philadelphia, PA (US); Dino D. Mancini, Broomall, PA (US)

(73) Assignee: TDI Novus, Inc., Philadelphia, PA (US)

( * ) Notice: Subject to any disclaimer, the term of this patent is extended or adjusted under 35 U.S.C. 154(b) by 0 days.

(21) Appl. No.: 18/961,174

(22) Filed: Nov. 26, 2024

Related U.S. Application Data

(60) Provisional application No. 63/605,908, filed on Dec. 4, 2023.

(51) Int. Cl.
*G06F 40/20* (2020.01)
*G06F 40/40* (2020.01)
*G10L 15/22* (2006.01)

(52) U.S. Cl.
CPC .............. *G10L 15/22* (2013.01); *G06F 40/40* (2020.01); *G10L 2015/223* (2013.01)

(58) Field of Classification Search
CPC ... G10L 15/22; G10L 2015/223; G10L 15/20; G10L 15/26; G06F 40/40
See application file for complete search history.

(56) References Cited

U.S. PATENT DOCUMENTS

| | | | |
|---|---|---|---|
| 9,262,927 B2 | 2/2016 | Populus et al. | |
| 9,665,645 B2 | 5/2017 | Hawley | |
| 9,922,569 B2 | 3/2018 | Bilek et al. | |
| 10,143,027 B1* | 11/2018 | Singh | H04W 76/14 |
| 11,049,500 B2 | 6/2021 | Olabiyi et al. | |
| 11,955,012 B2 | 4/2024 | Baladhandapani et al. | |
| 12,007,492 B2 | 6/2024 | John et al. | |
| 2016/0192166 A1 | 6/2016 | DeCharms | |

(Continued)

OTHER PUBLICATIONS

M. SC. Maximilian Reimann, "Automatic Speech Recognition of Maritime Radio Messages", Project description and overview, Apr. 4, 2023, 2 pages, Fraunhofer-Gesellschaft, Hamburg, Germany, https://web.archive.org/web/20230405000726/https://www.cml.fraunhofer.de/en/research-projects/marFM.html.

(Continued)

*Primary Examiner* — Abul K Azad
(74) *Attorney, Agent, or Firm* — Barley Snyder

(57) ABSTRACT

A system for processing a radio transmission, having a device having a housing including processor, memory, speaker and one or more communication interfaces, at least one radio monitoring a plurality of wavelengths and having a radio output signal; and a power supply. The system including a signal to noise service module to detect variations in a signal-to-noise ratio for the radio output signal, to identify transmissions received. The system also provides a transcription service module to convert audio into a text string, and natural language processing (NLP) service module to identify an intent classification for the transmission. The system includes a logging service module to direct the radio output signal, text string, and data containing context information, to archive as logged entries in a memory storage database.

18 Claims, 19 Drawing Sheets

(56) References Cited

U.S. PATENT DOCUMENTS

| | | | |
|---|---|---|---|
| 2020/0372796 A1* | 11/2020 | Gajapala | G08G 1/0141 |
| 2021/0020168 A1 | 1/2021 | Dame et al. | |
| 2022/0115008 A1* | 4/2022 | Pust | G08G 5/21 |
| 2022/0189316 A1* | 6/2022 | Paul | G05D 1/0022 |
| 2022/0246150 A1* | 8/2022 | Pust | G08G 5/26 |
| 2023/0230613 A1 | 7/2023 | Michaeli et al. | |
| 2023/0368682 A1 | 11/2023 | Baladhandapani et al. | |
| 2023/0385323 A1 | 11/2023 | Agarwal | |
| 2024/0379098 A1 | 11/2024 | Pont et al. | |

OTHER PUBLICATIONS

Juan Zuluaga-Gomez, et al., "ATCO2 corpus: A Large-Scale Dataset for Research on Automatic Speech Recognition and Natural Language Understanding of Air Traffic Control Communications", Journal article, Jun. 15, 2023, 29 pages, Cornell University Library, Ithaca, New York.

PCT International Search Report and Written Opinion dated Feb. 25, 2025, corresponding to Application No. PCT/US2024/057500, 16 pages.

* cited by examiner

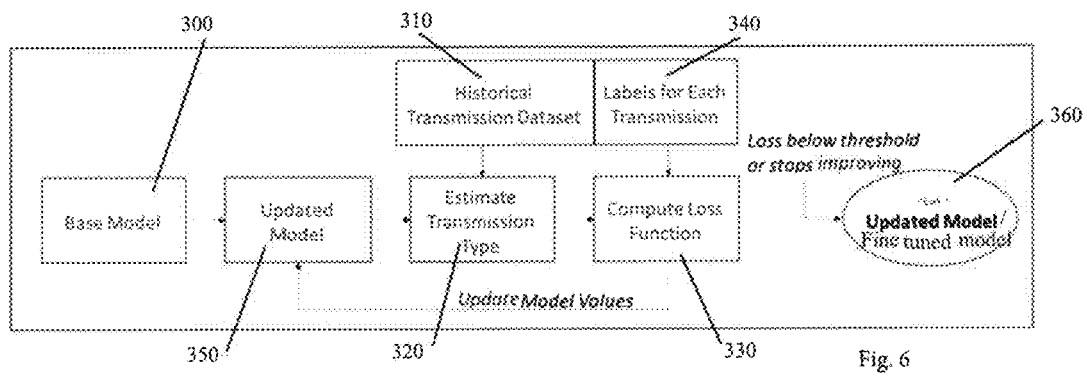
Fig. 6
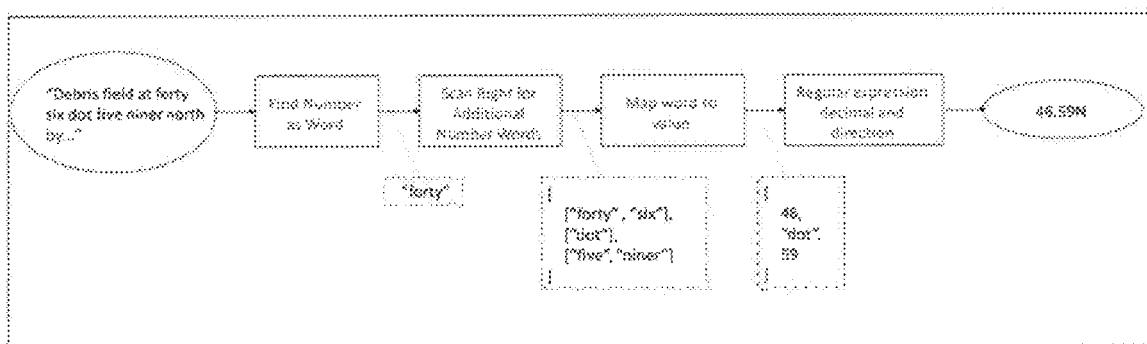
Fig. 7
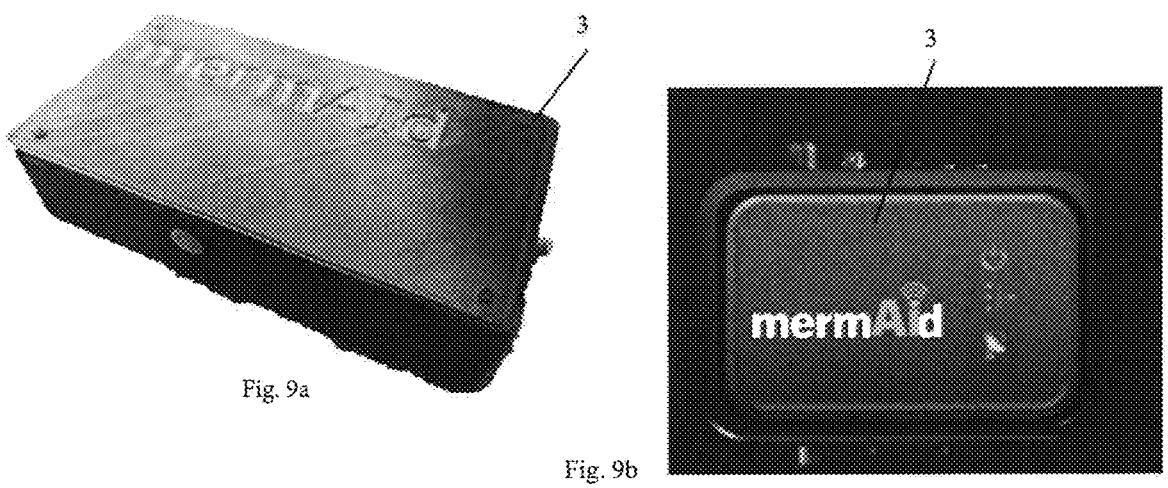
Fig. 9a
Fig. 9b

AUTOMATED SYSTEM AND METHOD THAT SERVICES INQUIRING VESSELS

CROSS-REFERENCE TO RELATED APPLICATION

This application claims benefit to Provisional Application 63/605,908 filed on Dec. 4, 2023.

FIELD OF THE INVENTION

The present invention relates to a system that allows for autonomous (no human intervention) or semi-autonomous (little human intervention) communication with inquiring vessels through radio transmissions, such as Very High Frequency ("VHF") or (Ultra High Frequency "UHF"). The system provides hardware and software allowing automated interactions through radio broadcasts, such as may be useful to organizations such as Vessel Traffic Service ("VTS"), Bridge and Lock Operators, Mariners and Commercial Shipping, and Port and Harbor Security, air traffic controllers, pilots, or services associated with fire response departments, police, EMS, and transportation services, or others relying on quick, accurate radio communications. These organizations are non-limiting examples for utilization.

BACKGROUND

When humans cooperate and interact, it is often done with spoken word. In some circumstances, these communications are done over VHF. There is a need for a software system to ingest spoken word, and contextually understand the meaning of those words, transcribe the words, and log the information while converting that meaning to actions relevant to the inquiry and purposefully respond back to the inquiring vessel i.e., a human conversation participant(s).

Applicant has developed a system for autonomously performing those duties, allowing purposeful communications with the inquiring vessel and aid operators in seafaring situations. Other areas of application for the system can include, but are not limited to, aircrafts, cars, submarines, and space systems.

Very High Frequency (VHF) and Ultra High Frequency (UHF) voice communications are used to convey voice information in many scenarios, including maritime operations, typically in the marine VHF voice band (156-174 MHZ). Similarly, aircraft operations are typically within the airband (108-137 MHz), additionally other entities rely on radio voice communications, including entities such as transit authorities, and emergency services. Typically, the radio transmissions are fleeting and are relied upon for point-to-point information sharing and alerting. While these transmissions are sometimes recorded, or logged for review in cases of incidents, the multitude of transmissions are not automatically processed by software.

For example, a commercial mariner may benefit from a tool to review recent transmissions to ensure they are aligned with the intentions of other nearby vessels. For example, there is a need for the system that would allow a ship captain to review transcribed text or replay a recent transmission to confirm that another vessel requested a port-to-port passage. That mariner would also benefit from the system alerting the mariner, such that the mariner would know when being hailed on a channel, even if the hail is over a frequency that their hand-held radio is not currently listening to.

There is a need for a system that can capture fleeting transmissions, record the transmissions to a log, and interpret the meaning of the transmission for generating a response. Further, there is a need for a system that can beneficially be applied or equip unmanned maritime vehicles with the ability to hold conversations with human piloted vessel, thereby arranging for safe navigation.

There is a need for a system that can beneficially be applied in domains beyond maritime applications. For example, there is a need for a system that can be applied within any suitable domain, including the marine and air domains, as well as ground and space domains. For instance, such a tool can help any user with a need to process transmissions, such as Air Traffic Control (ATC) to quickly review and assess the current air space. In cases of low-volume airports, and likely not having a dedicated air traffic controller, there is a need for a system that can either (i) route transmissions to a remote controller or (ii) automatically receive transmissions, process the transmission, and generate a response such that the system can provide responsive information to pilots. There is a need for a system that may also be integrated into a flight autonomy package. There exists flight autonomy software for small aircraft meant to safely land the plane in the event that a pilot is incapacitated during flight. There is a need for a system that can integrate or interact with a flight autonomy software, and can thereby help to arrange safe approaches with nearby airports even if the pilot is unable to speak.

SUMMARY

In an exemplary embodiment of the invention, there is provided a system for processing a radio transmission from a transmitter, and having a device having a housing with at least a processor, memory, speaker and one or more communication interfaces, at least one radio monitoring a plurality of wavelengths and having a radio output signal; and a power supply; the system providing at least a signal to noise service module that is configured to detect variations in a signal to noise ratio for the radio output signal and identifying when a transmission is received based on the detected variations in the radio output signal. The system also provides a transcription service module that is configured to convert the radio output signal into a text string, and a natural language processing (NLP) service module that is configured to perform natural language processing of the text string and evaluate a set of data containing context information, and identify an intent classification for the radio output signal using the inputted information. The system also provides a logging service module that is configured to direct one or more of the radio output signal, the text string, and the set of data containing context information, to archive as logged entries in a memory storage database.

In an embodiment, the NLP service module provides at least a transmitter determination submodule that is configured to identify the transmitter of the radio transmission; a recipient determination submodule that is configured to identify the intended recipient of the radio transmission; a transmission type determination submodule that is configured to apply text classifier algorithm to identify the intent of the radio transmission; and a position extractor submodule that is configured to perform an algorithm to analyze the text string and identify positional information within the text string and provide a position output data for plotting on a display for the system.

In an embodiment, one or more of the communication interfaces provides a connection to a network and comprises at least one of a wired connection component and a wireless connection component. In an embodiment, the device is portable and is communicatively coupled to at least the power supply, a monitor, and an antenna.

In an embodiment, the system further provides a graphical user interface through which a user may review the logged entries. The graphical user interface may provide a transmission display module configured to display one or more of a listing of logged entries, a map module, and a message transcript module. In an embodiment, the radio is a plurality of radios, and may include at least one software defined radio. Furthermore, in an embodiment, the device may include a speaker, and may play the audio from a selected message, or sound an alarm.

In an embodiment, the system may further provide a trigger service module configured to analyze the intent classification provided by the NLP service module, and identify an alert condition and initiate an alert event. The alert event may be one or more of sounding an audible alarm, providing a notification to a user personal device, initiating a radio warning broadcast, and providing an alert to an external service.

In an embodiment, the system may further provide a listener software module configured to a stream of information from a user datagram protocol, and record the stream of information to memory as a digital audio file. In an embodiment, the system further provides a translation service module configured to translate the text string into a different language.

In another exemplary embodiment, there is provided a system of monitoring radio transmissions of one or more transmitters over a larger area, the system providing a plurality of devices associated with different carriers (e.g., vessels, vehicles, aircraft) and in communication with a network; wherein each device serves as a node for the system and each device comprises a housing with at least a processor, memory, speaker and one or more communication interfaces, at least one radio monitoring a plurality of wavelengths and having a radio output signal; and a power supply. Each device may provide, or the system may provide at least a signal to noise service module, a transcription service module, a NLP service module; a logging service module, as discussed herein.

BRIEF DESCRIPTION OF DRAWINGS

FIG. 6 is an exemplary process flow for the performance of the algorithm for identifying the training the intent or transmission type classifier, according to an exemplary embodiment of the invention;

FIG. 7 is an exemplary process flow for the performance of the algorithm for identifying and extracting positional information from a transmission, according to an exemplary embodiment of the invention;

FIG. 9a depicts an external perspective view of the enclosure for the device, according to an exemplary embodiment of the invention;

FIG. 9b depicts an external plan view of the enclosure for the device, according to another exemplary embodiment of the invention;

DETAILED DESCRIPTION OF THE EMBODIMENTS

In an exemplary embodiment of the invention, the invention provides a system for voice interaction with other entities via radio broadcasts, such as UHF and/or VHF.

Figure 1A:
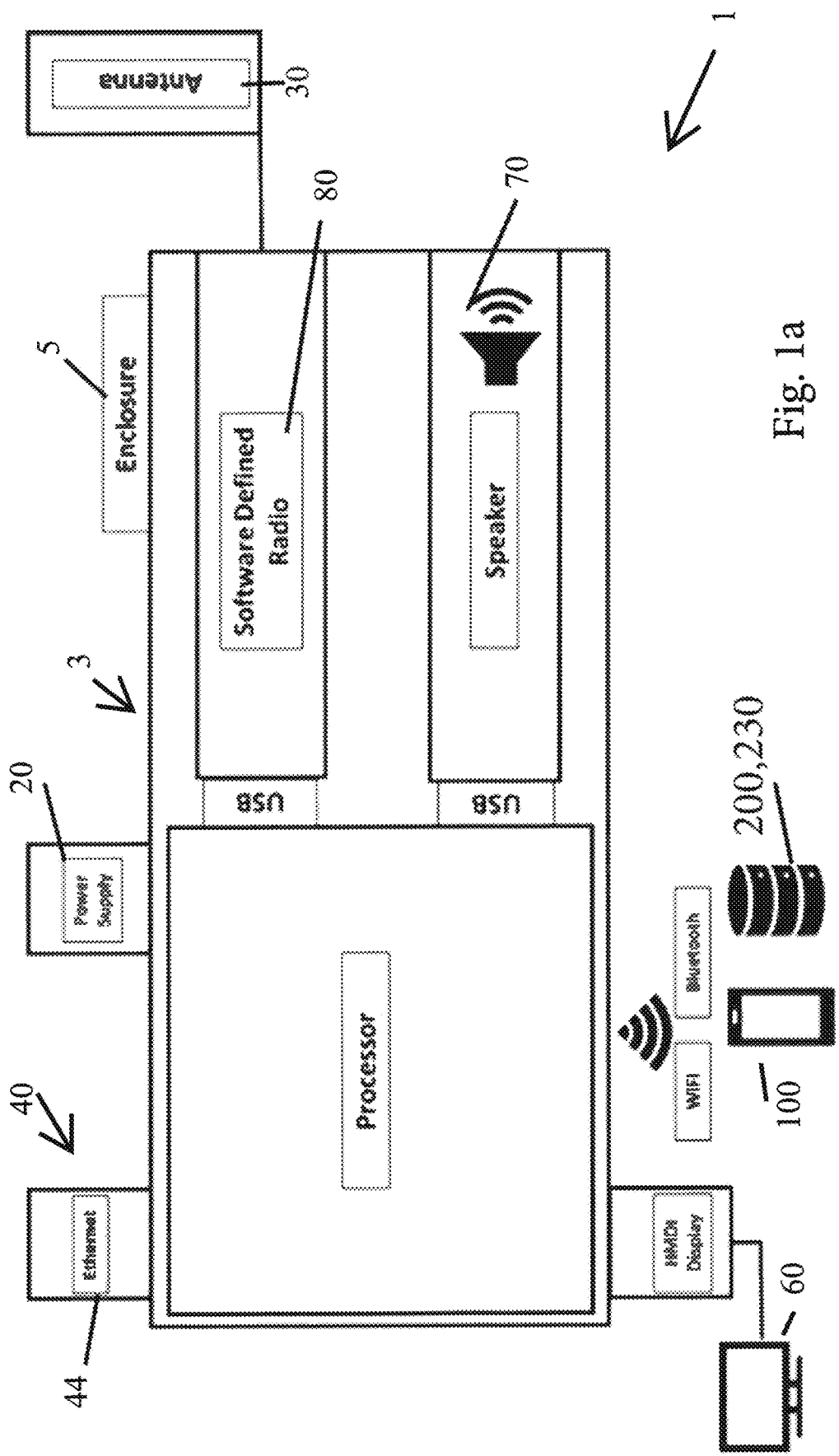
FIG. 1a is a schematic diagram of an exemplary hardware infrastructure for a device as part of a system according to an exemplary embodiment of the invention.

As illustrated in FIG. 1a, a hardware arrangement of the system may include a compact device, having a housing providing a unit housing at least some of the components of the system and/or operatively connected to system components that may be positioned away from the housing, with the housing being sized and configured to be easily integrated into a suitable environment, such as a vessel, vehicle, aircraft, or building. The housing, as depicted in FIG. 1a may contain all, or at least some of the necessary components for the system. Thus, the system may include hardware, software and/or firmware responsible for managing the equipment (e.g., sensors, radio units, beacon decoders) for data gathering, and performing the analysis of the gathered information aspects from the data generated by the sensors and equipment.

In an exemplary embodiment, and as depicted in FIG. 1a, the housing may be an enclosure, and includes, or is communicatively coupled (e.g., in electronic communication) with a VHF Antenna that is communicatively coupled with a radio transceiver, which may be a software defined radio transceiver. One example of a transceiver that can be used is the Garmin Cortex-M1 radio. The software defined radio transceiver is connected to a power supply or power input port, and thus the radio receives power from a power source, which may be a standalone battery unit, as may be appropriate for a portable device, or alternatively powered by an onboard power supply for the subject vessel, craft, vehicle, or building to which the system is integrated. Additionally, the software defined radio transceiver may be connected to a processor for processing software by any suitable methodology, such as a wired ethernet connection, though it is contemplated that wireless connection may be provided to similar effect in facilitating electronic communications between components of the system.

In an embodiment, the system 1 provides for a portable device 3, as an enclosure 5 housing a processor 10 having memory, software defined radio 80, speaker 70, and providing various interfaces or ports for connecting to additional exteriorly positioned components, as shown in the external views of FIGS. 9a and 9b.

The processor 10 of the device 3 and the processors of the one or more other local or remote computing devices, such as personal device 100, or those associated with local and cloud storage (e.g., data servers) and databases 200, 230 can be any suitable processor capable of executing instructions to process data and perform operations as described herein. For example, the processor 10 can comprise one or more central processing units (CPUs), graphics processing units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can be processors when configured to implement encoded instructions.

The memories for processor 10, as well as local storage and databases 200 and cloud storage and database 230 are examples of non-transitory computer-readable media. The memories can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/flash-type memory, or any other type of memory capable of storing information. The architectures, systems, and individual elements described herein can include many other logical, programmatic, and physical components, of which those shown in the accompanying figures are merely examples that are related to the discussion herein.

With reference to FIG. 1a, the device may therefore include at least a power port for connection to a power supply 20, which may be a battery pack, or an external power source; a display port for connecting to a display 60, one or more network ports 40, such as a wired network port (ethernet) 44 and/or a wireless communication device 42 (e.g. Bluetooth, Wi-fi card); a port for connection to an antenna 30; and an integrated speaker 70, all provided on, or within, or separately connectable to the housing enclosure 5 for the device 3. The system 1 can include physical and/or logical interfaces for connecting the device 3 to another computing device or a network. For example, the communications components, such as devices or ports 40 can enable Wi-Fi-based communication such as via frequencies defined by the IEEE 802.11 standards, short-range wireless frequencies such as Bluetooth®, cellular communication (e.g., 2G, 3G, 6G, 6G LTE, 5G, etc.) or any suitable wired or wireless communications protocol that enables the respective device to interface with the other remote computing devices, such as personal devices 100, and or servers or storage and databases 200, 230. Optionally, the portable device for the system 1 may provide one or more ports for connecting to one or more RF direction finder(s) 90. Details of the device are discussed with reference to the schematic drawings of FIGS. 1a and 1b.

Referring to FIG. 1a, a schematic representation of an exemplary system is depicted. In the depicted embodiment, the system 1 comprises a device 3 with at least a processor 10 (e.g., a computer processor) fitted within a housing or enclosure 5 and having interfaces for connections to, or alternatively integrating various components into the housing that interface with other components of the system. As shown in FIG. 1a, the system may provide a power supply 20, which may be integrated into or onto the enclosure 5, for example through a replaceable or rechargeable battery pack; or the enclosure may provide an interface, such as a plug or port for connection to an external power supply 20. The enclosure 5 may also provide at least one radio 80, which may be integrated within the housing, or an exteriorly positioned radio 80 that may be connected through an interface plug. Additionally, the enclosure 5 may provide an antenna 30, which may be an integral antenna or provide an interface for connecting the system 1 to an exteriorly positioned antenna. The antenna 30 may be attached to, or in electronic communication with the at least one radio 80, and thereby serve to improve signal strength and quality for transmissions received or sent by the radio 80. The antenna 80 may utilize any suitable connector types, such as SMA connectors, or PL-259 connectors, such that the system may easily interface with readily available commercial antennas, as will be familiar to those of skill in the art. In an embodiment, the device provides for a dedicated antenna, rather than rely on a multi-function antenna utilized by multiple components, or radios. Such an embodiment may be beneficial where a user may wish to use a singular antenna for receiving radio transmissions on the device and transmitting their own VHF radio calls. This scenario is not uncommon in RF applications, where multiple devices are transmitting and receiving at or nearly at the same frequency. This scenario however, may pose a problem if it is the case that the power delivered from a transmitter may overwhelm the signal input of a receiver who shares the same antenna, potentially causing damage to the circuitry of the device's receiver. To alleviate this problem, the described device may be provided with appropriate RF circuitry, as will be familiar to those of skill in the art, that can serve to reduce signal power to which the receiver may be exposed, while the transmitter is active. Solutions that may prevent such an occurrence, depending on user requirements, may include one or more of a directional coupler, RF switch, power limiter, an RF duplexer, and or frequency selective attenuators. In sum, these components will mitigate the risk of a transmitter overpowering the device's receiver when connected to the same antenna. In another embodiment, the system may provide for multiple antennas, e.g., one for transmitting, and one for receiving, with appropriate shielding or circuitry provided, as discussed earlier, that would mitigate the potential for a transmitting signal to overpower the circuitry of the receiver.

The enclosure 5 may further provide at least one network interface or connection 40 for accessing a network, such as a wireless connection component 42 configured to allow a wireless connection to a network, such as a Wi-Fi connection, or a Bluetooth connection, or other suitable form of network communication protocol. Furthermore, the enclosure 5 may provide a wired form of a connection interface 40, such as an ethernet port 44, to allow wired communication to a network. A wired connection port may be provided as either an alternative to, or in addition to, the wireless communication component 42 protocol provided as part of the system (e.g., Wi-Fi, Bluetooth). In an embodiment, the computer processor 10 may emit a WiFi or Bluetooth signal, or may connect to an existing WiFi or Bluetooth signal, to share output with any form of suitable connected client devices, such as cell phones, laptops, or tablets. This may also be facilitated via wired Ethernet connection. The computer processor may optionally use any of these network connections to transmit recordings, transcribed text, translated text, extracted details, and other metadata to a database server or remote cloud environment.

The enclosure 5 may optionally provide for an integrated display 60 or alternatively may provide an interface, such as a connector port for connection to an exteriorly positioned display. In an embodiment, the display 60 may be a display monitor integrated into the system 1, with the display being visible from outside of the housing enclosure 5, or alternatively, the connector port for a display 60 may be any suitable interface connection or port, e.g., HDMI, VGA, Display Port, USB, or wireless connection such as Bluetooth or airplay, or any other suitable connection form for allowing information from the processor 10 to be directed to a display 60, as will be familiar to those in the art. In an embodiment, the system may provide a speaker 70 or a speaker port communicatively coupled with the processor, with the speaker configured to produce audible sound as directed by an output from the processor 10. One or more of the components may be provided within or mounted to the enclosure 5, or connected via an interface connection. In this manner, the enclosure 5 may provide modular assembly, by providing various ports or openings, to accept connections to other components of the system. For example, the enclosure 5 may provide at least a power supply port, for receiving a connector to a power supply 20, such as a battery, or source of power for operating the system. Similarly, it is contemplated that one or more of the speaker(s) 70, antenna(s) 30, radio(s) 80, or display(s) 60, such as a monitor, may be provided outside of the enclosure 5, and electronically or wirelessly connected, such as through a wireless connection as previously discussed, or communicatively coupled via a port provided through the housing enclosure 5, as will be familiar to those of skill in the art.

In another embodiment, the system 1 may further comprise an embodiment providing at least one radio 80, which may include a software defined radio (SDR), and a processor 10 within the enclosure 5, and the system 1 may optionally provide one or more of a speaker 70, a display 60, and an antenna 30. It is recognized that any of the components for the system may be provided integrated into the housing, or alternatively, may be connected through an interface or plug or otherwise communicatively coupled, in order to provide electronic communication between the components of the system 1.

In an embodiment, at least one radio 80 may be provided in the form of a plurality of SDRs, such that the system, utilizing the plurality of SDRs is able to simultaneously monitor several frequencies, or scan and monitor multiple frequency bands, and thereby receive and monitor transmissions over a wider spectrum, and with less lag, than would be possible with just a single radio monitoring a wide spectrum of frequencies (e.g., VHF and UHF spectrums).

In an embodiment, the radio 80 has an integrated speaker, which may be the same, or distinct from the speaker 70 of the system. The speaker 70 may thus provide audio output from the radio 80 and/or the produce sounds as directed by the processor 10. Thus, the speaker 70 may play, or replay audio of radio transmissions received, whether live, or archived in memory, as discussed herein. Additionally, the speaker may sound notification alarms as instructed by the system 1, for example, in response to a generated trigger alert, as will be discussed.

Figure 1B:
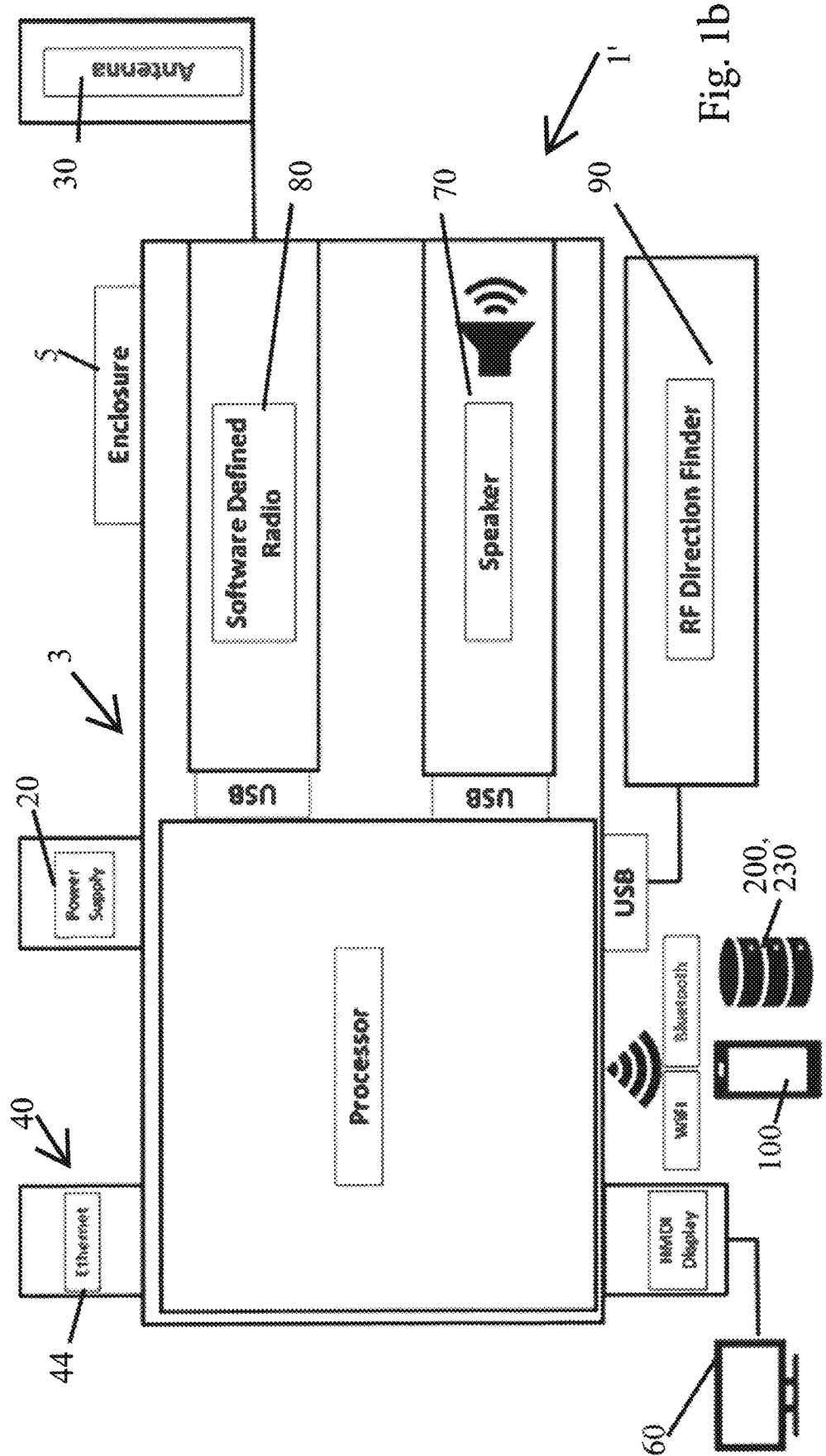
FIG. 1b is a schematic diagram of an exemplary hardware infrastructure for a device that is part of an alternative system incorporating an RF direction finder, according to an exemplary embodiment of the invention.

In another embodiment, and as depicted in FIG. 1b, the system 1' may be as previously described with reference to FIG. 1a, and further provide at least one radio direction finder 90 communicatively coupled with the processor 10, such as through a suitable interface, for example, a connector port which may be a USB connector, though it is contemplated that any suitable connector may be employed for exchange of information between the processor 10 and the RF Direction Finder 90. In an embodiment where a lone direction finder device 90 is used, the direction finder may provide information to the system 1' information about the bearing to a VHF or UHF emission. In an embodiment where multiple direction finder devices 90 are used, the direction finder devices' collective information may provide information to the system 1' under consideration the approximate location of a transmitter, by assessing the intersection point of each direction finder 90 device's estimated bearing to the emission. In either case, the output from DF devices 90 is used by the system 1' to more accurately determine the vessel, aircraft, or other entity that has emitted the received transmission.

In an embodiment, the system 1 may wirelessly communicate with a user's personal device 100, such as a tablet, or smart phone having a personal display, such that information may be electronically exchanged between the processor 10 and the personal device 100.

In an embodiment, the processor for the processing of software may be communicatively coupled to memory, and may further communicate with Network Attached Storage, which may include, or have access to memory, such as may be provided in a database. The network for the system serves to facilitate communication between any of the software elements of the system, and may be any suitable network system, including local area networks (LANs), wide area networks (WANs), and any new networking system developed in the future. In an embodiment, network may be a set of hardware, software, and protocols that is configured for electronic communication. For example, network may be any one of a global data network (e.g., the Internet), a regional data network, mobile/cellular wireless network, or a local area network. Moreover, the invention provides a plurality of perception sensors that receive or sense information in the vicinity being sensed or monitored, and may include, but not limited to global positioning satellite (GPS) information, or other location sensors, radar sensor information, to locate the relative location of the radar sensor and nearby traffic or objects that are detectable through radar systems, camera sensor information (e.g., visual and infrared systems), sonar sensors, or navigation sensors, such as transponder beacons and receivers, such as those associated with automatic identification systems (AIS) or automatic dependent surveillance-broadcast (ADS-B) transponders that have navigation sensor modules that sense navigation information and may broadcast the navigation information to nearby vessels, and may receive navigation information from other vessels in the area (collectively "extraneous information"). Each of the perception sensors having a hardware component thus may provide a respective perception sensor software module, that packages the sensed information into a manner that can be interpreted or accessed by the remaining components of the system 1. The one or more perception sensors thus provide information to, or are in communication with the processing software as it communicates back and forth with the autonomy software. In an embodiment, an in-context response generated by the system may be prepared through the processing software, and the response then sent to the radio 20 via a suitable communication method, such as the ethernet connection, and subsequently the signal from the radio is directed to the antenna for outgoing transmission broadcasting.

According to the teachings herein, there is provided a device 3 as part of a system 1 capable of automatically processing radio broadcast transmissions to recognize the content of the message and understand the meaning or impact of each radio transmission monitored. It is contemplated that multiple devices may be operatively connected via wireless communication methods, with each device being associated with a different vessel, aircraft, vehicle or building, and each device serving as a node, whereby the multiple device cooperatively monitor and share radio transmissions occurring over a greater region (i.e., occurring in an area greater than the radio range of a single node). The processing and interpretation of the intent or understanding of the purpose of the transmission may be achieved through the use of Natural Language Processing (NLP) software through a Natural Language Service Module 170, where the processor 10 processes information from the transmission in an algorithm to assess the meaning and impact of the transmission in context, with the algorithm providing the system 1 to perform one or more steps, including a determination of the intent of the message, reviewing the meaning of the message in context of relevant information from the text and any outside information (not provided within the broadcast), identifying the source or transmitting party of the message as well as the intended recipient, such that the system 1 may allow the generation of a relevant and appropriate response (e.g., as a method of understanding a transmission and generating a response), or provide a responding transmission to incoming transmissions after each incoming transmission has been analyzed or processed by the system 1. The system may provide software that processes information such that the system may ingest spoken word, and contextually understand the meaning of those words, transcribe the words, and log the information while converting that meaning of the transmission to actions relevant to the inquiry and purposefully respond back to the inquiring vessel i.e., a human conversation participant(s).

In the maritime space, the system may provide for an automated method to transcribe, translate, and process marine VHF voice communications, as such an automated method may have many applications. In an exemplary embodiment, the system may be useful for a Vessel Traffic Service (VTS), as it will allow the user to quickly scan through recently transcribed transmissions to be aware of ongoings within a region of interest. In an exemplary application of the system, a boater may notify the VTS that a navigational aid has drifted, or a mariner who makes an emergency mayday request, indicating that a crew member has fallen overboard. VTS, or other harbor safety authorities, such as Coast Guards, may benefit from the system being capable of providing real time translation capabilities to incoming transmissions, in order to better monitor crew embarkment and disembarkation, thereby ensuring that activities occur at appropriate times and locations. In an alternative application, Harbor safety organizations may benefit from employing a system having NLP capabilities, where such a system may beneficially provide for alerts to a user, such as audible alerts, where appropriate, for example, in emergency situations, such as collisions, as may be recognized by the system in receiving broadcast transmission conveying such information.

In an embodiment, there is provided a system that is capable of providing NLP processing, whereupon such system may provide as an output extracted information from the radio transmissions monitored, with such output being directed to Electronic Chart Display and Information Systems (ECDIS) units or web and mobile applications. For instance, Coast Guard services will often announce hazards to navigation such as a vessel that has run aground along with its latitude and longitude. There is a need for a system that can monitor transmission, and through NLP processing of incoming transmissions, the system may prepare a display showing a user the transcribed text, and further, the system may also provide or caused to be displayed a graphical overlay of the hazard's location on an electronic map.

In an embodiment, the system may provide the capability to automatically process incoming transmissions. Additionally, the system may be capable of recognizing and adapting to uncommon situations. For example, the system would beneficially identify dangerous conditions that require an immediate response, for example, where a vessel loses power and is nearing a bridge, the vessel may broadcast on appropriate frequencies, such as VHF, radio transmission that the vessel is no longer under control. Such a system may beneficially be provided with the capability of natural language processing (NLP) and adaptability to understand emergency indications, such an emergency broadcast, whereupon the system may be capable of initiating an appropriate response, including, for example, (i) updating digital signage to alert vehicle traffic and pedestrians to stay off the bridge, and/or (ii) send a signal to shut traffic barriers, or (iii) alert response personnel, such as emergency services.

In an embodiment, the system may be used to either automate or reduce the human effort necessary for bridge and lock operations. For example, where a boater is approaching a lock, and the boater may hail the automated lock tender, the system may recognize, process, and provide a response, such as may allow an automated lock tender to respond back to the boater with instructions, such as instructions to enter the lock, and the system may interact with other components to initiate an automated processes to have the incoming boat pass through the lock, for example by providing an automated response to allow the boater to pass through the lock.

According to an embodiment of the present disclosure, there is provided a system that is capable of resolving the identified needs above. In an embodiment, the system is capable of simultaneously monitoring frequency bands, for example, frequencies within the VHF and UHF spectrum, for voice activity and archiving each transmission. Upon detection of an incoming radio transmission, e.g., hearing voice activity, the system may transcribe the content of each transmission into a corresponding text representation. If the original transmission, as detected, is not in a user's preferred language, the system may perform a translation process for the recorded transmission, and/or the transcribed content. The recorded audio may be archived or stored in memory, such as by being placed in on-device and/or on-cloud storage, and the transcribed and/or translated textual representations may be placed into a database, which may be on-device and/or remotely located, such as an on-cloud database. The transcription of the message, and optionally translated, may be presented to a user via any suitable manner, such as through one or more of a Graphical User Interface (GUI), web application, mobile application, and/or Application Programming Interface (API) and presented on either or both of the display 60, or personal device 100. At any time, a user may access the information of one or more archived radio transmissions, such as allowing the user to review, search, sort, or filter a log of previous transmissions. Selection of a transmission from a list of transmissions received, for example, through a selection module via the GUI provided in a display for a personal user device 100, or from within the log, and may allow the user to access and replay the corresponding recorded audio file, and review details of that transmission.

After transcription and translation of the received radio broadcast message, the system performs an analysis, relying on one or more algorithms performed by a processor, and determines the transmitter, or the most likely transmitter of the message, using inputs including at least text-based information (for example, the text of that message being analyzed, or in the context from previously analyzed messages), data gathered from Automatic Information System (AIS) reports, and optionally using information learned from a Radio Frequency (RF) Direction Finding (DF) system. In the case of aircraft applications, the device may use Automatic Dependent Surveillance-Broadcast (ADS-B) reports in place of AIS reports to identify a transmitter.

If feasible, given the content of the transmission, the system will also determine the intended recipient for a given transmission. For a mariner or an aircraft pilot, it may be valuable to determine and be made aware if another entity is hailing on a channel that the radio is not currently tuned to.

The system may seek to understand and classify the intent of a received transmission, if applicable. Intent may be determined by reviewing at least the content of the message, the context of the situation (e.g. one or more of positional aspects of transmitter and other vessels in the area, navigational hazards or features nearby, context clues as information collected from previously messages, and/or AIS or ADS-B information, or any other form of extraneous information, if available). Exemplary intent categories, to which a transmission may be assigned may vary based on the context or domain in which the broadcast is made. Representative examples of intent categories to which a transmission may be assigned by the system include: an emergency alert, a notice of a navigational hazard, or a hailing initiation, as non-limiting examples. It is contemplated that particular intent categories will vary based on the domain in which the broadcast is made (e.g. marine transmissions, Air traffic transmission, ground vehicle transmissions, etc.). Such a domain may be determined through the frequency of the broadcast, or from inferred domain through the content of the transmission(s). While the invention is largely discussed with reference to mariner's radio traffic, it is contemplated that such a device may have broad applicability to any user with a need to process radio transmissions, where the system may allow autonomous monitoring of incoming transmissions, and aid in processing large amounts of transmissions over one or more frequencies, and alert the user to relevant messages, and provide context information relevant to the message. Thus, the teachings herein may be generally applicable to mariners, air traffic, transportation services, and may further be of assistance in military applications, police, fire, coast guard, ambulance/emergency services, as well as transportation services.

After NLP processing is applied, the system may optionally execute user-configurable triggers to perform some action. Example actions include sounding an audible alarm, sending a notification to a mobile application, sending a message to a defined network location, or generating a response for transmission via a radio broadcast, e.g., over VHF or UHF radio.

In an example embodiment, the radio 80 for the system 1, which may be at least one Software Defined Radio (SDR) is provided to monitor voice activity on desired frequencies, for example, in the VHF and UHF spectrums, and may further receive AIS and ADS-B reports.

In an example embodiment, there is a system 1 having a computer processor 10 that hosts the below set of software services. By 'host', it is meant that the processor 10 while maintaining electronic communications with other components of the system 1, performs runs algorithms and performs calculations and generates output values, and may provide instructions to other components of the system, such that the system is configured to perform tasks, as discussed below.

The system provides Signal to Noise Service in which the signal to noise service module 130 monitors one or more specified frequencies to determine if the signal to noise ratio is elevated above a specified threshold. When the threshold for the signal to noise is exceeded is an indication that some strong signal is present on the frequency. While the signal remains above the specified threshold, the data is recorded to an audio file, thus capturing broadcast radio transmissions over that frequency or channel.

The system may provide a text form of received messages, and if necessary, convert the text into a specified language through a transcription and translation module, thereby creating a text string representation of the voice in the recorded audio file.

The system may further recognize transponder beacon information through an AIS/ADS-B decoder service module, monitoring encoded navigation information from a SDR and converts it into interpretable AIS/ADS-B information indicating data, such as a vessel's name and position.

The system may provide Natural Language Processing, where an NLP service module analyzes received transmissions and context information and identifies the transmitter, intended recipient, transmission type, and extracted details from the text of a transmission The system may provide a logging service, as the system takes the transcribed and optionally translated information, and its associated metadata, such as the time and received frequency and places each message entry into a database. It also transmits recorded audio, transcribed text, translated text, and extracted details to the cloud for cloud-based storage and remote monitoring.

The system may provide a trigger service module that executes user defined responses for incoming transmissions.

The application service exposes recorded audio, transcribed text, translated text, and extracted details to an authorized API or GUI user, such that the information can be easily viewed on a monitor, or alternatively presented to a interface on a user's personal device, such as a smartphone or tablet.

The system may provide a transmit service module that can transmit recorded or streamed audio to a cloud environment for additional processing.

In an example embodiment, the device may include a Direction Finder to more accurately assess the transmitter of a given transmission.

In an example embodiment, the device may include a Bluetooth module to interact with mobile applications.

In an example embodiment, the device may include a WiFi module to interact with mobile applications and transmit information to the cloud.

In an example embodiment, the device may include an Ethernet module to interact with remote clients over an API, local web applications, and to transmit information to the cloud.

In an example embodiment, the device may include a speaker to sound an audible alarm for user defined triggers such as emergency alerts.

In an example embodiment, the device may include a display screen for a user to visualize the device's output on a GUI without the need for a mobile device.

The software architecture for the system may be arranged in any suitable manner for performing the tasks described herein. For example, it is contemplated that the software architecture for the system 1 may be provided in at least two distinct manners, though one skilled in the art will recognize that modifications to the teachings herein are possible and still fall within the spirit of the teachings herein. Firstly, a generally local arrangement is possible, in which substantially all of the functional operations for the system are performed locally, to provide a functional system that maximizes the independent, or autonomous operation of the system, by minimizing or not requiring outside contact or remote access, such as where the high level processing functions applicable to detected radio transmissions, for example, transcription, translation, NLP, logging, and triggering is performed entirely locally, and on the carrier vessel, craft, vehicle itself associated with the system. Alternatively, a generally remote arrangement, provided as a second configuration, in which those services that may be beneficially performed remotely, can be performed in a cloud-based environment. In the latter configuration, the local aspects of the system provides the functions of signal collector, monitoring the VHF or UHF spectrum, and capturing AIS/ADS-B information, and optionally, DF information for detected transmissions. For this embodiment, the collected signals/transmissions are transmitted to a remote (e.g., cloud) environment in which transcription, translation, NLP, logging, and triggering services are executed. There may be a benefit to such an embodiment, where the remote environment is not subject to the practical limitations of being physically present on a carrier vessel, craft, or vehicle, with impacts ranging from reliability due to placement on a moving vessel, craft, or vehicle with associated vibrations, as well as dealing limiting resources, such as physical space, power consumption, variable wireless communications signal strength, interference or radio jamming, are avoided by virtue of not being present on a vessel, but rather are practically unlimited due to being remotely positioned.

Figure 2A:
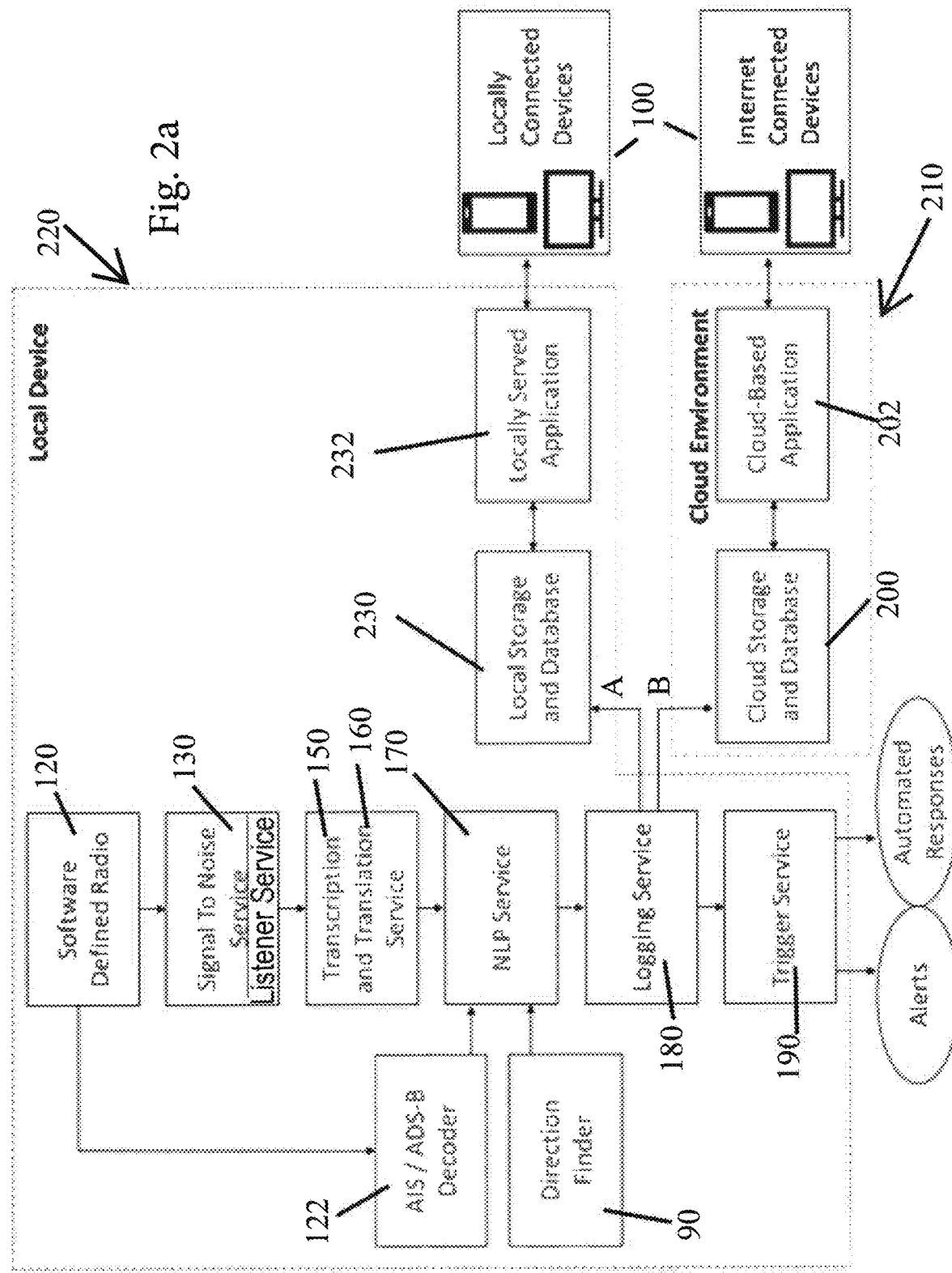
FIG. 2a is a schematic diagram of an exemplary software arrangement for an embodiment of the system providing both local device environment and a cloud environment, according to an exemplary embodiment of the invention.
Figure 2B:
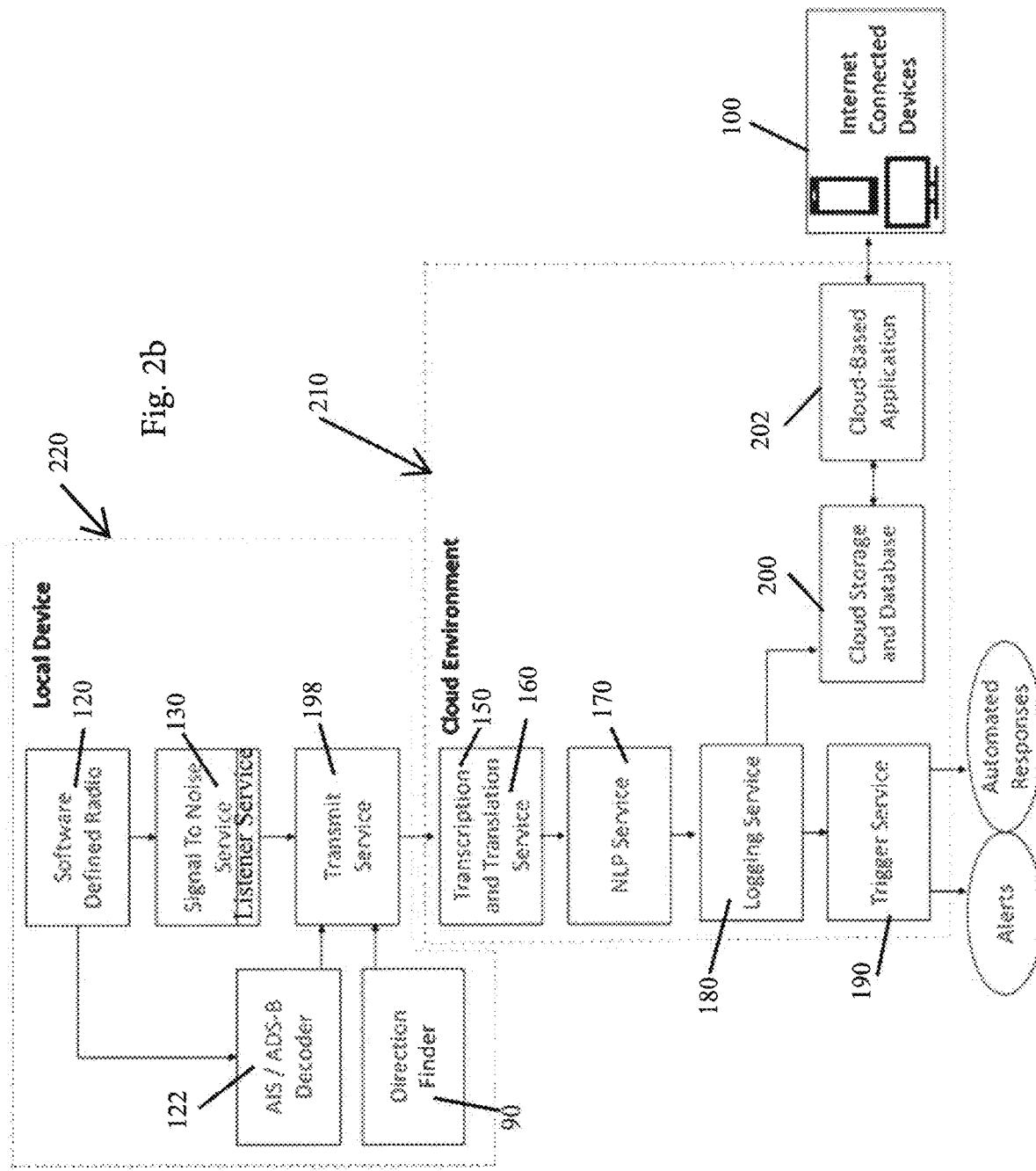
FIG. 2b is an alternative schematic diagram of an exemplary software arrangement for an alternative embodiment of the system providing a cloud environment, according to an exemplary embodiment of the invention.

With reference to the figures, FIG. 2a depict an embodiment of the software architecture in which local operations and functionality are emphasized, while FIG. 2b depicts an embodiment of the software architecture in which remote operations and functionality are emphasized.

Local Processing Embodiment of the System

In an embodiment of the system, the system is configured to operate locally, in an independent manner, and need not require electronic access to, or wireless communication with remote devices, components, or outside databases or information for ongoing regular operation. Though it is recognized that the system may selectively allow or utilize access to remote devices, components or outside databases, when conditions warrant, for example, a periodic software update, or when there is no risk to mission and access to remote components may be beneficial. For the local processing embodiment, as an example, the system may be applicable in the case of a marine, aircraft, or military or autonomous application, there may be a need for the system to be capable of operating without immediate access to outside information beyond that available within the confines of the carrier of the system (e.g., aircraft, vessel, vehicle), that is, for such a local processing embodiment, all of the steps for the ongoing regular activities of this embodiment of the system should be capable of being performed locally, or via a wired network connection, so as to avoid generating a signal that may negatively impact an ongoing mission for the vessel, vehicle, or craft with which the system is associated, for example, in situations where there would be a benefit to maintaining radio silence, secrecy, or in operation in regions where internet access is limited or not possible.

In FIG. 2a, there is depicted a general software arrangement for a local processing variant of the system. As shown in 2a, the variant is provided having a Radio Direction Finder module for interacting with a Radio Direction Finder 90, such as that depicted in FIG. 1b. It is contemplated that the teachings of the general software arrangement from FIG. 2a could similarly be applied for a local processing variant of the system depicted in FIG. 1a, only with the Radio Direction Finder component 90 having been deleted or unused. With reference to FIG. 2a, the local processing variant of the system may beneficially be provided with hardware including a computer processor 10 that has the capability of meeting or exceeding the anticipated performance demands for performing substantially all of the processing logic and command executions necessary for the entirety of the system, as the local processing variant would be capable of independent operation. The general software arrangement depicted in FIG. 2a is characterized by being capable of operations in a manner that do not require any reliance upon external processors or information sources that are not in a wired or physical connection to the host vessel, vehicle or craft. Though, as shown, the general software arrangement depicted in FIG. 2a may alternatively be selectively capable of operations in a manner that do rely upon external processors or information sources through wireless communications, and not necessarily in a wired or physical connection to the host vessel, vehicle or craft.

In the embodiment of the software arrangement depicted in FIG. 2a, there is provided a radio that is a software defined radio, utilizing a software defined radio module 120 to electronically communicate with the components of the system, 1, such as the radio 80 of FIG. 1a, 1b. In an embodiment, the software defined radio module 120 receives the incoming radio message transmissions and converts each broadcast to a digital audio file. If the message contains, or is identified as a beacon or transponder flash, e.g., containing navigation or identification beacon content, such as from an AIS or ADS-B transponder, the information will be decoded by the Decoder module 122, for example, where the SDR module 120 is caused to direct the incoming beacon message to a Decoder Module 122, configured to extract the relevant content of the transponder message and provide the relevant transponder information for further processing and/or logging by the system 1.

If the incoming message does not relate to transponder information, and/or the SDR Module 120 does not identify the incoming radio message as relating to beacon or transponder information, then the SDR Module will direct the data file of the received broadcast for further processing by the system 1. Each data file for a radio message received through the radio 80 may beneficially be processed for enhanced clarity by reducing static or radio noise. In an embodiment, the SDR transceiver may provide audio filtering and noise reduction, or a noise-reduction module may be applied using noise reduction algorithms as are familiar to those of skill in the art. The SDR module 120 may optionally process the incoming audio message for clarity in any suitable manner, such as by application of a filter algorithm or employing an audio filtering component (e.g., band pass or selective audio filters) in order to reduce noise in the message prior to being transcribed or processed further by the system. In an embodiment, the SDR module 120 is able to filter the raw audio file to reduce transmission and environmental noise prior to being transcribed and/or logged to memory. The output from the SDR Module may then be further processed through an optional Signal To Noise Service Module 130.

The Signal To Noise Service Module 130 further processes the output from the at least one radio 80, and thereby scans the desired, relevant frequencies, and identifies a transmission to record or cause the audio to be streamed (e.g., directed to speaker 70 only when the Signal-to-Noise Ratio (SNR) for the monitored frequency exceeds a specified threshold. SNR is a measure of signal clarity, comparing the level of the desired signal to the background noise. To dynamically compute the noise level, the Signal To Noise service module 130 performs a rolling average of each specified frequency. For most of the time, no signal is present for any of the frequencies. The rolling average value of the signal is assessed as the noise value for that particular frequency. When a transmission does occur on that specific frequency however, the signal jumps above this dynamically computed noise level, and the Signal To Noise Service module 130 is caused to capture the incoming data stream in any suitable audio file (e.g. .wav or mp3 format) and/or streams the transmission of that frequency via User Datagram Protocol (UDP) to a listener software module, which may be associated with the device 3 and may be a program operating through the locally served application 232 (in the local device environment 220) or through the cloud-based application 202 (in the cloud environment 210). In an embodiment, the listener software module may be series of coded instructions for processing by processor and may be a receiver for the UDP; and may be a device for capturing (e.g., recording) the streamed information from the Signal to Noise Service Module 130. The Listener Software Module thus may be a logging device to capture incoming transmissions' audio data files. In an embodiment, the Listener Software Module may be a Digital audio recorder that creates time stamped recordings of transmissions as files, that can be associated by the system with additional gathered information (transponder beacon, direction finder) information and sent for logging in a database for future review, retrieval and/or replaying. Regardless of the method of transmit, when the SNR is detected and recognized as being above a defined noise threshold value (e.g., the SNR is above a background ratio value), the audio data from the monitored frequency is delivered to a Transcription and translation Service Module 150, in the form of a radio message data file, which may be in any suitable format for the audio transmission (e.g., .wav, .MP3, or any suitable format for sound/audio data files, and may optionally be associated with any other identifiable information associated with or relevant to that transmission (e.g. time of broadcast, RDF data, if present, transponder information).

For example, when monitoring a frequency for sufficient amount of time, where there has been no broadcast transmission over that frequency, the average signal (e.g., measured dB) is interpreted as the background. When a broadcast is transmitted over that frequency, the signal will change as the broadcast is received, and may be detected as change in signal strength (e.g. different measured dB). The system may be assigned a default Signal to Noise ratio where the signal is deemed adequately different from the background noise such that the listener software module will be caused to stream and/or log the transmission. Alternatively, the system may learn the threshold signal to noise ratio as exposed to broadcast transmissions, or the user may alter or define the threshold value for identifying the occurrence of a broadcast over that frequency. This assessment of the signal to noise ratio may be repeated for each monitored frequency, or alternatively, a representative threshold value is assigned in one of the methods above, and applied over the range of frequencies monitored. As the background noise for each frequency may vary based on the location, and interference associated with each frequency, the most accurate threshold determination would be determining the proper threshold for each frequency on a case by case basis, and updating periodically over time by through ongoing monitoring of each frequency.

The radio message data file as output from the Signal to Noise Service module 130 may then be processed through a transcription and translation Service module 150. The transcription and translation Service module 150 may process the message file by transcribing the audio data signal into text, which may be electronically manipulated and presented as a text string. The transcription and translation service module may utilize any suitable algorithms as are known for converting speech to text (STT). The conversion algorithm for converting speech to text may utilize machine learning techniques, and neural networks to recognize patterns in data and thereby achieve high efficiency rates in converting the speech (audio format) to text (string format), with minimal errors and in proper context for the nature of the transmissions.

Figure 8:
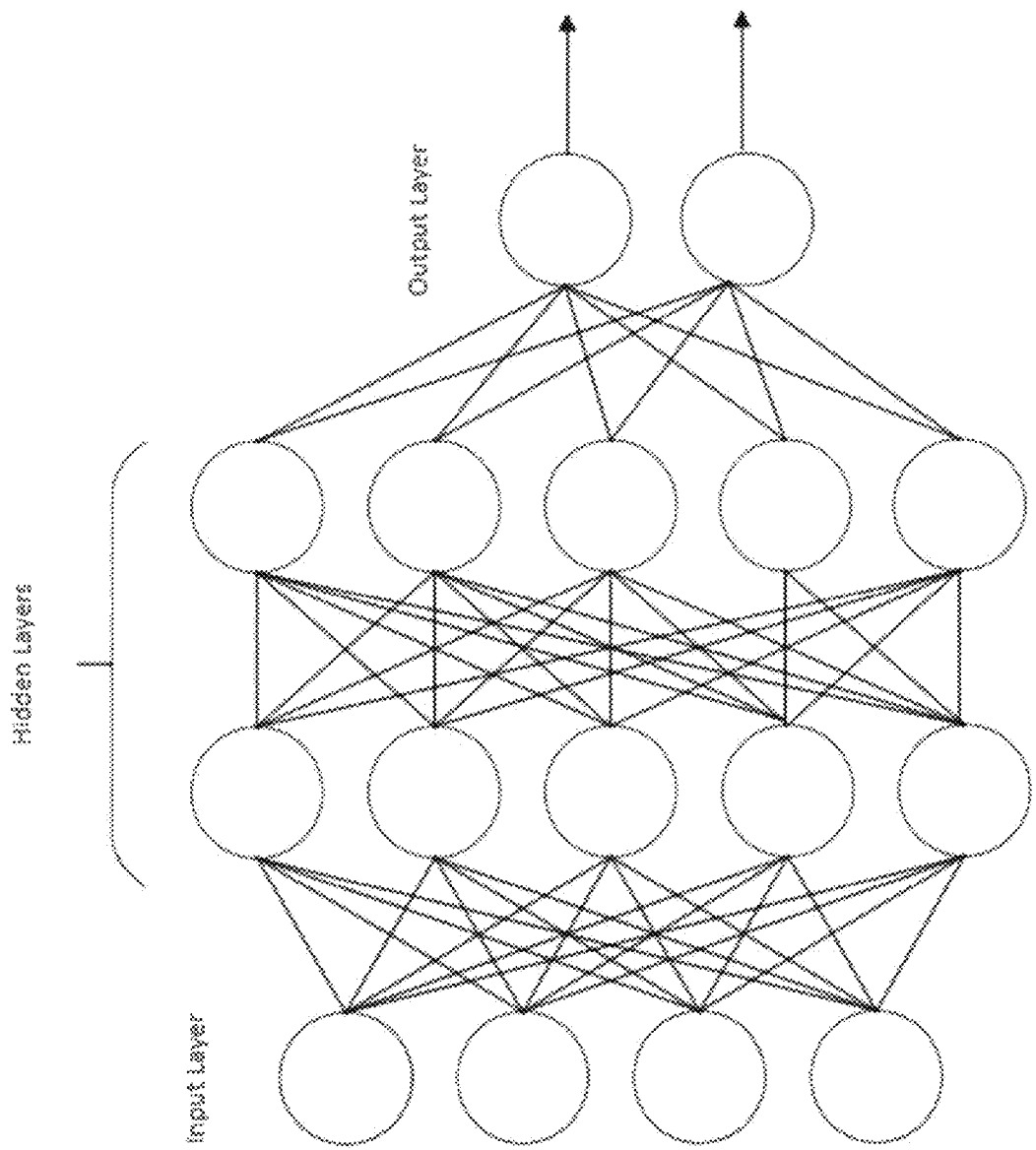
FIG. 8 illustrates an example deep neural network, as may be applied within an exemplary embodiment of the invention.

Neural networks (NN) are a type of deep learning that uses a mathematical or computational model to process information. NNs can learn from data, such as can be derived from sensors, or inputted data entries, and adjust to improve performance, thus referred to as a form of machine learning. The system 1 described herein may utilize any suitable neural network for achieving the computational model to achieve the goals taught herein, such that the neural network can process the information provided, and provide a suitable output, e.g. accurately converting speech to text, or identifying the intent of a transmitted radio message. In an embodiment, the neural network may provide at least an input layer, a plurality of hidden layers, and an output layer, as shown in FIG. 8. In an embodiment, there is provided a deep neural network (DNN) that is a deep auto-encoder neural network (deep ANN) or a convolutional neural network (CNN). Each layer of the neural network may have one or more nodes. Other neural network structures are also possible in alternative embodiments of the DNN, in which not every node in each layer is connected to every node in the previous and next layers. Operation of the machine learning process including neural network model tuning and automatic speech recognition, intent classification, and natural language processing, such as may be utilized by the system can serve to convert incoming radio transmission (e.g., speech) into text strings and interpreted by the system to obtain an understanding and classify the intent of incoming radio transmissions would be familiar to those of skill in the relevant art of machine learning, and embodiments for the processing may be performed as described herein.

Further details machine learning and artificial intelligence, such as may be utilized for converting speech to text through automatic speech recognition processing, determining intent through natural language processing, and neural network machine learning are described below.

Automatic Speech Recognition

Figure 11:
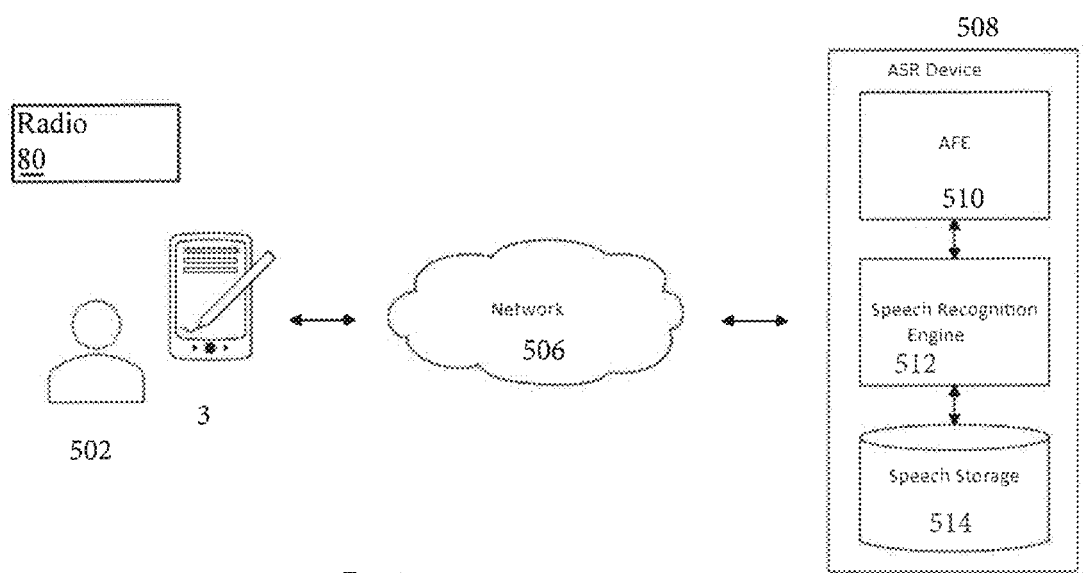
FIG. 11 is an exemplary process flow for the performance of automatic speech recognition and performance of an algorithm there for, as may be applied in an exemplary embodiment of the invention.

FIG. 11 illustrates an exemplary embodiment of local automatic speech recognition processing of phrases or words. In the embodiment shown, the local device 3 is capable of recognizing a subset of words and phrases that are commonly employed and recognized as frequent words and phrases. In this embodiment, for the remaining subset of words and phrases that are not recognized by the device, the local device 3 may directs that subset for further processing and recognition through a remote automatic speech recognition (ASR) device 508. In an alternative embodiment, the local device 3, or radio 80 may perform no speech recognition at all, but rather, every word and phrase from received radio broadcasts may be directed to the remote automatic speech recognition (ASR) device 508, as discussed below.

Figure 3:
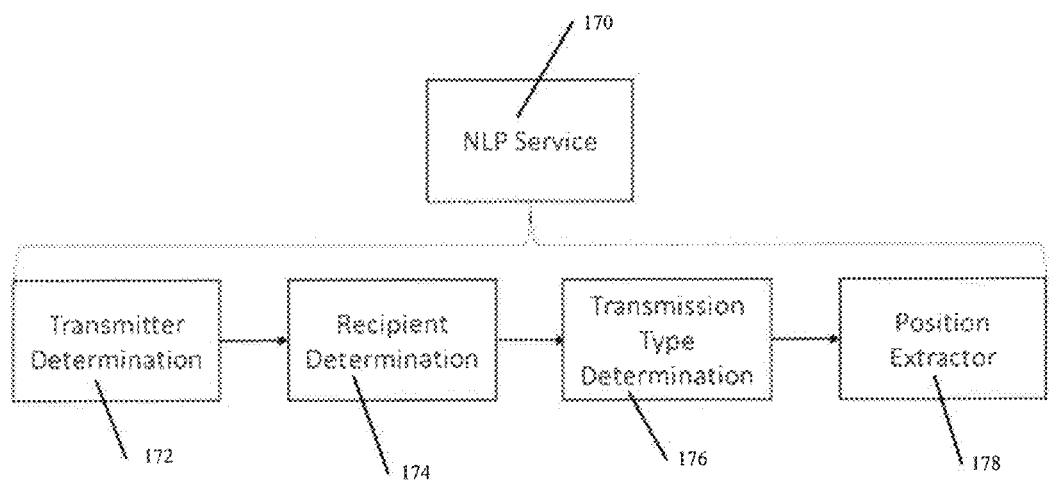
FIG. 3 is a schematic diagram of an exemplary embodiment of a NLP service module and associated submodules for performing the natural language processing of messages, according to an exemplary embodiment of the invention.

The figure illustrates a user 502, the device 3, or a radio 80. The radio 80 in an embodiment, may be incorporated into the device 3, or may be provided as an external component to the device 3 and is communicatively coupled thereto. In an embodiment, each of the user 502, radio 80, or device 3 may provide or process one or more frequent phrases or words. As shown in FIG. 3 there is further provided a network 506, and a remote automatic speech recognition (ASR) device 508 in communication with the local device 3 over the network 506. In one embodiment, the local device 3 receives an audio input from the user 502, or the radio 80. The local device 3 compares the audio input to one or more speech recognition models for frequent phrases or words and determines whether the audio input includes a frequent phrase or word. When the local device 3 determines that the audio input includes a frequent phrase, the local device processes the frequent phrase by executing a command corresponding with the phrase. When the local device 3 determines that the audio input does not include a frequent phrase, the local device 3 causes the audio input to be directed for further processing through the remote ASR device 508 through the network 506 for performing the steps for ASR processing (e.g., speech recognition). After the remote ASR device 508 performs speech recognition on the audio input, the speech recognition results can be transmitted over the network 506 back to the local device 3 for further operations.

In another embodiment, the local device 3 can transmit the entire audio input to the remote ASR device 508 over the network 506 for ASR processing, either in parallel with the local device 3 or without ongoing speech recognition processing from the local device 3. In an embodiment, where the local device 3 identifies a frequent phrase in the audio input, the local device 3 may transmit an indication to the remote ASR device 508 informing the remote ASR device 508 that the local device 3 has recognized a frequent phrase and the remote ASR device 508 may forego ASR processing on the audio input. Alternatively, the local device may perform no speech recognition processing at all, but merely directs the message to the remote ASR device 508, for performing the necessary algorithm and calculations to convert the speech to text, as described below.

The ASR device 508 may include a processor that may be a central processing unit (CPU) for processing data and computer-readable instructions and a memory for storing data and instructions. The memory may include volatile random-access memory (RAM), nonvolatile read-only memory (ROM), and/or other types of memory. The ASR device 508 may also include a data storage component for storing data and instructions. Computer instructions for processing by the processor for operating the ASR device 508 and its various components may be executed by the processor and stored in the memory, storage, external device, or in memory/storage. In an embodiment, the ASR device 508 may be a locally served application 232 (as shown in FIG. 2a). In an alternative embodiment, the ASR device 508 may be a cloud-based application 202 (as shown in FIGS. 2a, 2b). In either event, the ASR device 508 may access local and cloud storage and databases 230, 200, as appropriate, for performing the speech recognition procedures described herein.

The ASR device 508 can also include optional input/output devices. Example input devices include an audio capture device, such as a microphone, a touch input device, keyboard, mouse, stylus, or other input device. Example output devices include a visual display, tactile display, audio speakers, headphones, printer, or other output device 100. The input/output device may also include a network connection or a wireless communication device, such as Bluetooth, Wi-Fi, broadband, etc., to a network, such as the Internet, or other devices. In one embodiment, the ASR device 508 can include an audio capture device (such as a listener module, or signal to noise service module 130) for recognizing and capturing spoken utterances for processing. The audio capture device 508 may also include a microphone or other suitable component for capturing sound.

The ASR device 508 can also process spoken audio data into text by transcribing audio data into text data representing the words of the speech contained in the audio data. The text data can then be used for various purposes, such as executing system commands, inputting data, etc. Audio data, including spoken utterances, can be processed in real time or saved and processed later. A spoken utterance in the audio data is input to the ASR device 508, which then interprets the utterance based on the similarity between the utterance and models known to the ASR device 508. For example, the ASR device 508 may compare the input audio data with models for sounds (e.g., speech units or phonemes) and sequences of sounds to identify words and phrases that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on several factors including, for example, the similarity of the sound in the utterance to models for language sounds (e.g., an acoustic model) and the likelihood that a particular word that matches the sounds would be included in the sentence at the specific location (e.g., using a language or grammar model). Based on these factors, the ASR device 508 may output the most likely words or phrases recognized in the audio data.

The components for processing spoken audio data into text of the ASR device 508 can include an acoustic front end (AFE) 510, a speech recognition engine 512, and speech storage 514. The AFE 510 can receive audio data and transform it into data for processing by the speech recognition engine 514. The speech recognition engine 514 compares the speech recognition data with the acoustic, language, and other data models and information stored in the speech storage 514 for recognizing the speech contained in the original audio data, and may direct the recognized speech to the recent voices database 122. The AFE 510 may also reduce noise in the audio data, if not previously performed by the device 3, or radio 80, and identify parts of the audio data containing speech for processing, and segment and process the identified speech components.

The speech recognition engine 512 can process the output from the AFE 510 about information stored in the speech storage 514, which may be a dedicated memory component, or server, or may be referring to one or both of the local or cloud storage and database 230, 200 of FIGS. 2a,b. The speech storage 514 can include a variety of information for speech recognition, such as data matching pronunciations of phonemes to particular words and/or phrases. This data may be referred to as an acoustic model. The speech storage can also include a dictionary of words or a lexicon and can also include data describing words and/or phrases that are likely to be used together in particular contexts. This data may be referred to as a language or grammar model. Other information may also be stored in the speech storage 514 for use in speech recognition by the speech recognition engine 512 in conjunction with language phonemes, words, and/or phrases as known in the speech storage 514. The contents of the speech storage 514 can be prepared for general ASR use or may be customized to include sounds, words, and phrases that are likely to be used in a particular application. The speech recognition engine 512 can use many different techniques to match information to phonemes. For example, a Hidden Markov Models (HMMs) may be used as a technique.

Natural Language Processing

Figure 10:
FIG. 10 depicts a natural language processing platform for automated training and performance evaluation in a computing environment, according to an exemplary embodiment of the invention.

FIG. 10 depicts a natural language processing platform for automated training and performance evaluation in a computing environment, as may be utilized in the practice of an embodiment of the invention. The natural language processing (NLP) platform 02 may include one or more computing devices configured to perform one or more of the functions described herein. For example, NLP platform 02 may include one or more computers or processors (e.g., laptop computers, desktop computers, servers, or server blades, on board processors). In an embodiment, the processing for the NLP platform may be the processor 10 of the system 1. In another embodiment, the processor for the processing for the NLP platform may be a processor in a remote connected device or computer 100, or may be a processor, and associated memory components of either, or both, of the local served application 232, and may access the local storage and database 230, and/or the cloud-based application 202, accessing the cloud storage and database 200. In an exemplary embodiment, NLP platform 02 can be configured to perform NLP processing techniques in audio transcript file analysis, performing one or more tasks of: recognize speech and convert to text; perform language translation; and identify one or more intent categories (e.g., Emergency, Hail, Radio Channel Change); and/or evaluate performance based on the audio transcript files. Additionally, the NLP platform 02 can maintain a model for dynamic performance evaluation and training that the NLP platform may use 02 to analyze the audio transcript files. The NLP platform 02 can dynamically update the audio transcript files as additional audio transcript files and/or performance data are received. In another example, the NLP platform 02 can be associated with an entity (e.g., vessel, vehicle, craft), or may be a remote component accessed via wireless communication techniques.

The NLP platform 02 can include one or more processors 04, memory 06, and interface 08. A data bus (not shown) may interconnect processor 42, memory 06, and interface 08. Interface 08 can be a network interface configured to support communication between the NLP platform 02 and one or more networks (not shown).

Memory 06 may include one or more program modules having instructions that when executed by processor 04 cause the NLP platform 02 to perform one or more functions and/or one or more databases that may store and/or otherwise maintain information which the program modules may use and/or processor 04. In some instances, the one or more program modules and/or databases may be stored by and/or maintained in different memory units of the NLP platform 02 and/or by different computing devices that may form and/or otherwise make up the NLP platform 02. For example, memory 06 may have, store, and/or include the NLP module 06a, an NLP database 06b, and a machine learning engine 06c.

The NLP platform 02 may have instructions that direct and/or cause the NLP platform 02 to execute advanced natural language claim processing techniques. For example, the NLP platform 02 can apply NLP techniques to identify features in one or more audio transcription files indicative of one or more performance events and/or additional metrics associated with the audio transcription files.

Memory 06 may include several components or modules, as illustrated. The NLP database 06b may store information used by the NLP module 06a and/or the NLP platform 02 in transcription analysis, evaluating performance, providing performance feedback, and/or in performing other functions. Machine learning engine 06c may have instructions that direct and/or cause the NLP platform 02 to perform transcription analysis, evaluate performance, provide performance feedback, and to set, define, and/or iteratively refine optimization rules and/or other parameters used by the NLP platform 02 and/or other systems.

Neural Networks

FIG. 8 illustrates an example deep neural network in which embodiments of the present technology may be implemented. The deep neural network (DNN) includes an input layer, a plurality of hidden layers, and an output layer. In one embodiment, the DNN is a deep auto-encoder neural network (deep ANN) or a convolutional neural network (CNN).

As illustrated, the deep neural network of FIG. 8 has two hidden layers, although it is understood that alternative embodiments may have any number of two or more hidden layers. Each layer may have one or more nodes (represented by circles in the diagrammatic network). As depicted by the connecting lines, each node in a current layer is connected to every other node in a previous layer and a next layer. This is referred to as a fully-connected neural network. Other neural network structures are also possible in alternative embodiments of the deep neural network, in which not every node in each layer is connected to every node in the previous and next layers.

Each node in the input (visible) layer can be assigned a value and output that value to every node in the next layer (e.g., hidden layer). The nodes in the input layer can represent features about a particular environment or setting. For example, a DNN used for classifying whether an object is a rectangle may have an input node representing whether the object has flat edges. In this example, assigning a value of 1 to the node may represent that the object does have flat edges and assigning a value of 0 to the node may represent that the object does not have flat edges. In another example, a DNN takes an image as input. In this case, the input nodes may each represent a pixel of the image, such as a pixel of a training image, where the assigned value may represent the intensity of the pixel. Following this example, an assigned value of 1 may indicate that the pixel is completely black and an assigned value of 0 may indicate that the pixel is completely white.

Each node in the hidden layers can receive an outputted value from nodes in a previous layer (e.g., input layer) and associate each of the nodes in the previous layer with a weight. Each hidden node can then multiply each of the received values from the nodes in the previous layer with the weight associated with the nodes in the previous layer and output the sum of the products to each node in the next layer.

Nodes in the output layer handle input values received from the nodes in the hidden layer in a similar fashion. In one example, each output node in the output layer may multiply each input value received from each node in the previous layer (e.g., hidden layer) with a weight and sum the products to generate an output value. The output value of each output node can output information in a predefined format, where the information has some relationship to the corresponding information from the previous layer. Example outputs may include, but are not limited to, classifications, relationships, measurements, instructions, and recommendations. For example, a DNN that classifies whether the object is an ellipse, where an outputted value of 1 from the output node represents that the object is an ellipse and an outputted value of 0 represents that the object is not an ellipse. While the examples provided relate to classifying geometric shapes, this is only for illustrative purposes. The output nodes can also be used to classify any of a wide variety of objects and other features and otherwise output any of a wide variety of desired information in desired formats. Using the teachings herein, the neural network may be applicable for tasks required by the operation of the system 1, including the conversion of speech to text, and the classification of intent for received radio transmissions, as will be discussed.

Figure 12:
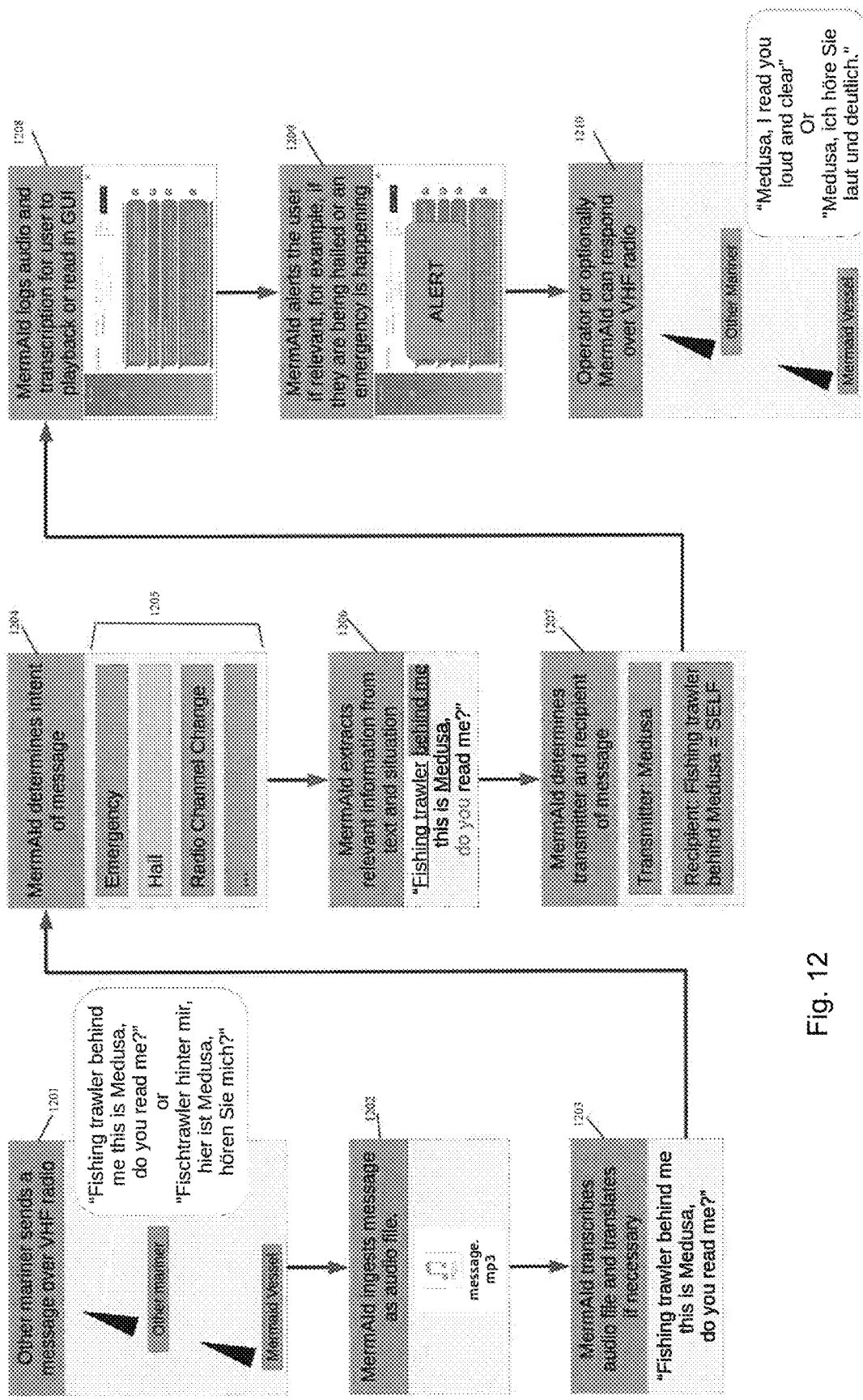
FIG. 12 is an exemplary flowpath of information and processes performed by the system, in an exemplary embodiment of the invention.

With reference to FIG. 12, there is provided a process flow path for an exemplary application of the device 3, where it receives an incoming radio message from an initial transmitter, processes the content of the message and identifies the intention of the message, logs the message and if necessary, generates an alert for the user, and proposes a response, or prepares a response to transmit to the initial transmitter.

In an embodiment, the STT algorithms as performed by a processor for the system, may first process raw audio signals to extract acoustic features (e.g., mel-frequency cepstral coefficients, intonations) that represent key elements of speech. Neural networks, such as Recurrent Neural Networks (RNNs) or Transformer-based models, are then used to assess these features, identifying phonemes, words, and complete phrases. It is contemplated that the STT algorithm as employed within the system 1, may use language models that predict word sequences based on context. In this manner, the STT algorithm provides improved accuracy by accounting for the likelihood of certain words appearing together. The outputted text string, or the audio data signal may be evaluated to identify the originating broadcast language of the message from the transmitter, and may optionally be translated into a different language, using algorithms for translation as are known in the art. Once the language conversion, if any, has taken place through the translation algorithm of the transcription and translation Service module 150, the output may again be provided as a translated text string, only now in the desired language for the user of the system 1. The resulting text string output from the transcription and translation Service module 150 may be further processed, and may optionally be graphically displayed to a display 60, or personal device 100 or logged to memory (e.g., in a database 230, 200), as discussed herein.

The output text string from the transcription and translation Service module 150 and/or the logged information from the audio file from the incoming radio broadcast message may be further processed through the Natural Language Processing (NLP) Service Module 170 as will be discussed, and directed to a logging service module 180, and evaluated by a Trigger Service Module 190. The logging service module 180 may direct any of the relevant information derived from the incoming radio broadcast, or associated with the broadcast, to a database or memory component, such that the information may be accessed for further processing by the system, or the information may be later recalled for review and interpretation, such as where a later message would benefit from an understanding of the context provided by an earlier message that had been received. Thus, in an exemplary application, the logging service takes the transcribed text, and metadata such as received frequency and time, and extracted details from the processing pipeline and inserts them into a structured database. It also places the raw audio files into persistent storage that may be accessed in the future. Each entry in the database is associated with an associated raw audio file so that a user may replay the recorded audio file.

The Trigger Service Module 190 reviews the analyzed message and information provided by the NLP Service Module 170 and assesses if there is a need to initiate a trigger alert through the system, such as sounding an alarm through speaker 70, or directing a communication to a user. In an exemplary application, the Trigger service module executes user defined triggers for different event types. Each trigger has at least one associated action. Example actions include oner or more of: transmitting an alert message by a generated synthetic voice on a specified frequency through radio 80; sending a mobile alert, utilizing the processor 10 to cause an alert to be directed electronically through a communication port 40, whether wired 44, or wireless 42, such as may be received on a user's personal device 100; sounding an audible alarm through speaker 70; and/or sending a network request to an external service, as will be familiar to those of ordinary skill in the art. If a trigger is enacted, all of its associated actions are performed, as defined by the user, or predetermined in the system 1. Each trigger defined for the Trigger Service module 190 is configured to run either based on time, or based on an incoming transmission. For time-based triggers, the user sets the periodicity of the action. For instance, a user may elect to broadcast an alert over a frequency every 1 hour. For triggers based on an incoming transmission, the user can configure the trigger to only run if specified conditions are met, such as a specific incoming Transmission Type. A user may configure a trigger so that hailing requests send a notification to their mobile application. Another user, such as a transit authority, may configure the device to trigger based on a detected Emergency transmission, with the associated action output from the trigger being to send a network request that requests or automatically initiates an action, such as the closing of a gate, thereby restricting access to a bridge.

In the embodiment of the general software arrangement depicted in FIG. 2A, where there is a need to limit outside communications or maintain radio silence, the actions of the Natural Language Processing and substantially all of the algorithms and processing steps may be performed by the processor 10 for the device 3 or within the system 1 in a local environment 220, without requiring any wireless connection to remote devices, or information. This is suitable for applications where a connection to the cloud is intermittent or non-existent, such as an ocean-going vessel or vessels operating in low-population areas with, at best, intermittent connectivity to the cloud. In these situations, it is still critical to receive hailing alerts or emergency notifications, and which may be processed through the system, even without internet connectivity, so, in such an embodiment all processing including the steps of transcription, translation, NLP, and trigger generation are performed on the device itself, and not utilizing remote equipment via wireless connection.

As can be seen from FIG. 2a, the logging service module may direct the output in two output scenarios, "A" for further processing within the local device environment; and "B" for further processing in a cloud, or remote environment. It is contemplated that the logging service module Thus, the architecture depicted in FIG. 2a, may also be compatible with an embodiment where a portion of the processing steps are performed locally, entirely in a local device environment 220, and while operating solely in the local device environment, not accessing a cloud environment 210. As shown, in the branch A, the information output from the Logging Service Module 180 may direct the information to be logged to a local storage module 230, which may be a database server, or memory, that can be accessed by a locally served application module 232, for allowing the user to access and review the information stored in the local storage module 200. In an embodiment, the database for the local storage module 230 may be a structured MySQL database, and a copy of the database may be preserved both on the device 3 itself in a local device environment 220, and further backed up (whether immediately, or periodically) within a cloud environment 210, in the cloud base storage and database 200. This dual setup is useful because it allows a user to review history even if they are not able to connect to the cloud. Meanwhile, storing data on the cloud allows a user/reviewer to review the device's output remotely even if they are not near the local device. In the same manner, audio files may be stored as mp3 or wav files both on the memory of the local device 3 in the local device environment 220 and within a cloud environment 210, in the cloud storage and database 200. Each of the locally served application 232, and the cloud-based application may provide at least a computer having a processor, having memory, and operating system, and be capable of communication with other components of the system, and accessing the appropriate storage and database component 200, 230, as well as locally or internet connected devices 100, and the computer processor of the device 3. The user may access the local storage module 230, via the locally served application module 232, that may be operatively connected to or controlled by the user's personal device 100, such as a computer, tablet, or smartphone, as will be familiar to those skilled in the art.

Additionally, the architecture depicted in FIG. 2a, may also be optionally compatible with an embodiment where a portion of the processing steps are selectively performed remotely in a cloud environment 210. As shown in FIG. 2a, the information output from the Logging Service Module 180, following the branch B may direct the information to be logged to a remote storage module 200, which may be a database server, or memory, that can be accessed by a cloud-based application module 202, for allowing the user to access and review the information stored in the remote storage module 200. The user may access the remote storage module 202, via the could based application 202, that may be operatively connected to or controlled by the user's personal device 100, such as a computer, tablet, or smartphone, as will be familiar to those skilled in the art.

Cloud Processing Embodiment of the System

In an embodiment of the system, at least a portion of the system is configured to operate in a cloud environment 210, characterized by the system having electronic access to, or being communicatively coupled with remote devices, components, or outside databases or information for ongoing regular operation, such as may be achieved through a wireless networked, and/or an internet connection to store, process, and access stored information with a remote component. Such an embodiment may be appropriate for example, in an instance where there is no need for limiting or restricting electronic communications beyond the confines of the carrier vessel, vehicle or craft, such that this embodiment of the system may be capable of operating with uninterrupted, and immediate access to outside information. Furthermore, as depicted in FIG. 2b, at least a minimal series of processing steps must take place in a local environment 220, in order to prepare the data to be shared with the cloud environment 210, as will be discussed. Thus, for the cloud processing embodiment of the system, at least one aspect of the regular processing steps of the system would consistently be performed via wireless or remote connection in a cloud environment, as may be provided through any suitable communication protocol e.g., cellular/radio data connection, wired network connection, satellite internet connection, or any other method as will be familiar to those of skill in the art.

With reference to FIG. 2b, there is depicted a general software arrangement for the cloud processing variant of the system. This embodiment shares many components with the local processing variant of FIG. 2a. In addition, the cloud processing variant includes at least a transmit service module 198, which is configured to transmit recorded audio files and/or streaming audio (e.g., incoming radio transmission, or processed radio transmissions), in addition to supporting data received from any AIS or ADS-B radio beacons, and optionally, information about each transmission gathered by an optional Direction Finder(s) 90, with the collective information transmitted to a cloud environment module 210 for further processing by the system in a remote environment. Thus the transmit service may be, for example, a wireless router, or a computer, or a server, the transmit service module 198 being configured to gather relevant information for each transmission being reviewed, and electronically send or present the information to the cloud environment module 210 for further processing, as will be discussed.

In comparison to the local processing variant of FIG. 2a, the transcription service module 150, translation service module 160, Natural Language Processing module 170, logging module 180, and triggering by the trigger module 190 of the cloud processing embodiment are all performed remotely, e.g., within the cloud environment module 210, rather than in a local device environment as is done with the local processing variant. The cloud processing variant of FIG. 2b is more suitable to locations that have stable wireless communications, or where practicing the invention is compatible with relying on remote data connections and may deal with large volumes of VHF or UHF conversations. Because cloud processing can scale to quickly meet a surge in traffic, this cloud variant of FIG. 2b is well-suited to applications such as Vessel Traffic Service or Air Traffic Control centers, who maintain stable internet connections and are likely to see large amounts of simultaneous voice traffic.

With regard to the embodiments of the system having the software architectures of FIGS. 2a and 2b, there are processes and algorithms that each variant will perform in common, such as the operations of the NLP Service Module 170, such as may be performed to assess the nature of the incoming transmission, and direct the preparation of a suitable system response, and the operations of the Trigger Response Service Module 190 operations, for determining when a trigger alert should be generated due to events indicated through incoming data and transmissions.

The elements described herein may be implemented as discrete or distributed components in any suitable combination and location, unless specified otherwise. The various functions described herein may be conducted by hardware, firmware, and/or software. For example, a processor may perform various functions by executing instructions stored in memory.

NLP Service Module

The NLP Service module 170, with reference to FIG. 3, is configured to process and autonomously interpret the intent or otherwise derive the purpose of a received transmission. In an embodiment, the NLP Service module 170 may operate in an autonomous, or semiautonomous mode, using sensors to acquire information, and perform the processing steps described as discussed herein, e.g., where in an exemplary application, a radio 80, or software defined radio module 120 receives transmissions that are identified as messages by operation of algorithm for the signal to noise service module 130, and captured by the system for further processing by the NLP Service module 170 as described below, all in an autonomous manner. The NLP service module 170 thus may receive as input the content of the radio messages along with any extraneous information (e.g., beacon data, direction finder data, radar data) and after processing the collected data generates a representative scene informed with data from a library having additional sensor data (e.g., library of messages upon which the system can be trained).

The NLP Service module 170 may utilize Natural Language Processing (NLP) software running algorithms performed on a processor 10 that processes information discerned from the text of the transmission, using one or more algorithms and routines to assess the meaning and evaluate the impact of the transmission in full context of the circumstances, with the NLP Service module 170 performing at least the following steps: determining the intent of the message; reviewing the meaning of the message in context of relevant information from the text, a set of previous transmissions received or sent, and any outside information that was not provided directly within the broadcast transmission being analyzed, but discernible by components (e.g., RDF 90, AIS or ADS-B decoder 122, radar information) of the system 1; identifying the source or transmitting party of the message, identifying the intended recipient; such that the system 1 may then interpret the impact of the message and allow the system to recommend, or autonomously generate a relevant and appropriate response to the message that had been received and analyzed. With reference to FIG. 3, the NLP service module 170 may utilize at least four sub-modules. These sub-modules utilize at least the converted text string, as resulting from the transcription service module 150, and optionally translation service module 160, and may further utilize the logged audio file for a transmission, in analyzing the specific transmission, and arriving at a determination of the intent, and analyzing any positional information conveyed by the specific transmission. Additionally, the NLP Service module 170, may utilize and review context information, that need not be contained within the words or text of the broadcast, such as that information received from any AIS/ADS-B transponder beacons, as received and interpreted by the Decoder module 122, and, if present, any information about the transmitter origination direction or triangulation information by the Direction Finder module 90, in order to determine the transmitter's location and identification. The NLP Service module 170, using the contents of the broadcast transmission being analyzed, along with any other contextual information, may thus identify who is transmitter and the intended recipient for a particular transmission, then categorize the nature or type of that transmission, and extracted position details of relevant actors to the message, including those positions of the transmitter, intended recipient, and any nearby vessels or vehicles, objects, hazards, equipment that may be impacted by or are impacting upon the message, or actions that are a consequence of the message. It is contemplated that additional context information that may be evaluated by the NLP service module include radar information, whether generated on-board radar systems, or as provided from an external source; and context as may be derived from earlier transmissions, such as previously utilized call signs, formal names, nicknames, alias, or identified entities by location cues, as well as previously generated navigation instructions or calls for assistance, and comparing the voice of the transmission currently being analyzed, in comparison to previously received transmissions, e.g., to identify similar voice characteristics, intonations, accents, background noise, as non-limiting examples. Thus, the NLP service module 170 is responsible for combining multiple information streams together, including transcribed voice, audio file, Direction Finding information, AIS/ADS-B information, situational positioning information and conversational history or context in order to extract information that is relevant, and in proper context from an incoming transmission that can lead to better alertness and response.

As depicted in FIG. 3, the NLP Service Module 170 may utilize one or more submodules for performing the analyzing and autonomously interpreting the intent or otherwise derive the purpose of a received transmission, using at least a Transmitter Determination submodule 172, a Recipient Determination submodule 174, a Transmission Type Determination submodule 176, and the Position Extractor submodule 178. Each of these submodules of the NLP Service Module 170 are described below.

Transmitter Determination Submodule

Figure 4:
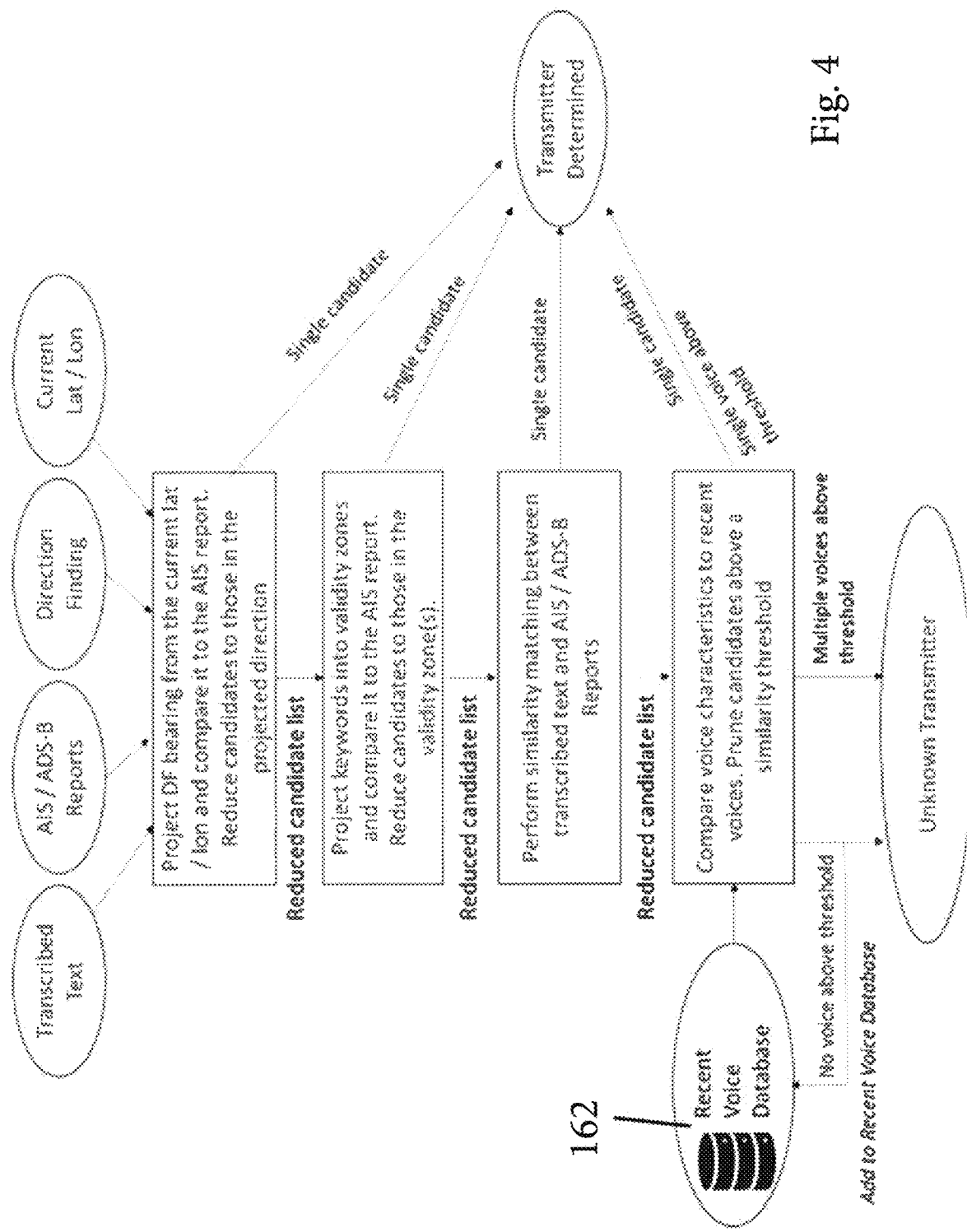
FIG. 4 is an exemplary process flow for the performance of the algorithm for identifying the transmitter of a transmission, according to an exemplary embodiment of the invention.

Determining the transmitter of a transmission, from among a variable number of possible transmitters, is an important component to understanding a voice communications. The system 1 may be required to determine how to react to a given transmission, and the reaction may change depending on the identity or determined location of the transmitter. This can readily be understood, in the context of the following example scenarios. In a scenario where an unrecognized first vessel broadcasts a transmission to inform a second vessel that it is currently on a collision course with a second vessel may generate a different reaction response from the second vessel, if the identity a first possible transmitter vessel, is determined to be approximately 30 miles away from the second vessel (the intended recipient), in contrast to another possible transmitter in the form of a third vessel that is only one half of a mile away from the second vessel. The urgency and nature of the response from the second vessel would naturally vary in this example based on the identity of the transmitter as the first vessel or the third vessel. In another scenario, a second vessel requesting to pass by a first vessel's starboard may require different maneuvering operations based on where the transmitter is physically located. Another example is if a vessel or aircraft broadcasts an emergency. It is critical to determine who the transmitter is and where the vessel is located. For the device of interest, the analysis of the Transmitter Determination submodule 172 for the NLP Service Module 170 performs the process steps depicted in FIG. 4, in the process of determining the transmitter of a transmission.

In an embodiment, the Transmitter Determination submodule 172 ingests input from all relevant sources, including at least the transcribed text, AIS/ADS-B reports, output from an optional Direction Finder device, and the current position of the vessel, craft, vehicle bearing the system.

If the system 1' is configured with the optional Radio Direction Finder 90, the system will perform an algorithm to identify the bearing to the transmission, relative to the subject vessel. In an embodiment, the model for determining the transmitter would project a cone from the current position of the device 3 into the direction of the bearing provided by the DF device 90. Although DF devices generally report a bearing to the emitter, there is generally some amount of error associated with the bearing estimate, so in order to account for the possible error, due to the inexact nature of the bearing determination, the system may project a cone rather than a single straight line (e.g., with a central axis line passing through and dividing the cone representing the highest likelihood bearing from the bearing determination, such that the cone represents a statistically significant likely indication of the bearing to the transmitter. The DF projection cone may then be overlayed onto the AIS or ADS-B report (which contains positions and optionally vessel names or nearby vessels). The union of the projected cone and the AIS/ADS-B will output a report listing of an initial candidate list of transmitters. If a single candidate remains on that initial list, the algorithm completes with the single determined transmitter, and need not perform further analysis.

It is contemplated that in addition to, or as an alternative to the projection of the cone over transponder information on a display map, the system may similarly utilize information generated by radar devices, as are known to those of skill in the art, and overlaying the cone onto the radar display or map to determine the bearing from the device to one or more vessels generating a return signature from the radar scan. As above, an initial listing of candidate transmitters may be generated by overlaying the DF projection cone onto the radar image or map.

Should there remain a need to further reduce the list of candidates output from the preceding determination, the Transmitter Determination submodule 172 may additionally analyze the transcribed text of the transmission for directional information. This requires performing an algorithm on the processor 10 that performs a similarity score matching between a set of directionality words. Example words in this set of directionality words that the algorithm will seek to identify from the message transcription are, for example, "port", "starboard", "south", "north", "left", and "right". This is not an exhaustive list, and may further utilize words that convey a vector or direction, such as "ahead" and "behind", or "at your 6:00". These listings of words and phrases may be trained over time through ongoing usage of the system, and incorporated into AI training through LLMs, such that the algorithms may learn to recognize words of similar impact or intent, even if not exactly the wording that was initially taught. Such improvement in relevance of models and system recognition of intent classification can be improved through additional training (e.g., AI model learning), or alternatively, human intervention or monitoring may note the presence of directional words to be added to the dictionary of words reviewed and monitored for in the transmissions. These words are used to convey relationships between vessel or aircraft, so that common utterances such as "this is the vessel to your port side" can be determinative for recognizing possible candidates as the identity of the transmitter. For each possible candidate, the algorithm creates a hypothesis with a "validity zone." A validity zone is associated with each word contained in the set of directionality words. For instance, in the example above, the algorithm will create a validity zone along each candidate vessel's port side and assess the entities in that area to pare down the list of candidates. If only a single candidate remains, the algorithm completes with the single determined transmitter, or provides a primary reduced candidate listing including only those vessels that satisfy the directional conditions set forth in the message.

Should there be a need to still further reduce the list of candidates output from the preceding determinations, the Transmitter Determination submodule 172 may further analyze transcribed text, along with the AIS/ADS-B report, such that the algorithm performed by the processor 10 determines a similarity score between words in the transmission, and vessel or aircraft identifiers, including names, call signs, or tail numbers as may be reported in the AIS/ADS-B reports. The similarity score determined by the algorithm of the Transmitter Determination submodule may use any suitable comparison method for evaluation of string similarity to determine relative identity between the identifier of the beacon information, and any identifier for the transmitter that can be discerned from the text of the transmission. In an embodiment, the algorithm measures string similarity using a Levenshtein distance analysis, or any other suitable measure for analyzing string similarity and establishing a threshold similarity to recognize identity, as known to those of skill in the art of information theory, for this sub-module assessment. If, after evaluating the similarities of the transcribed text along with beacon information, and there is only a single candidate above a set threshold, the algorithm completes with the single determined transmitter. The threshold for similarity using the Levenshtein distance may be defined as a default setting, but may be adjusted through the course of ongoing operations as the system learns to recognize similarities in identifying information through an AI learning model.

Should there be a need to even further reduce the list of candidates output from the preceding determinations, the Transmitter Determination submodule 172 may further prompt the algorithm to analyze unique voice characteristics and intonations. In such an analysis, the algorithm may analyze the message for characteristics within the audio of the message that may allow the system to associate a message with an identity that was determined through a previous message, such as be reviewing characteristics of the audio including, but not limited to, pitch, resonant frequencies, accent, and intonations to create and assess a voice fingerprint. In the audio analysis, the system may assign a voice fingerprint to a transmission that is represented by an array of values, where each value of the array of values may correspond to a particular voice or audio characteristic. In an embodiment, the system may store recent voice fingerprints in a rolling window, for example, in a Recent Voice Database 162 cataloging the voices captured from the incoming transmissions. The size of the rolling window may be determined by a defined value or measurement threshold, such as a rolling time period, or set number of transmissions received, or defined number of voices analyzed. For example, the rolling window for the purposes of analyzing a voice fingerprint may be defined to be any of, through the previous 5 mins, through the previous 15 mins, through the previous 30 mins, through the previous 60, through the previous 3 hours, through the previous 12 hours. The size of the rolling window may be defined or adjusted in view of several factors, including the extent of radio traffic captured, or adjusted in view of the capabilities of the system 1, 1', for example, there may be a limitation to the available memory and processing power required for performing the analysis that might require adjusting the size of the rolling window. For example, the system of FIG. 2b, operating largely in a cloud environment may be less limited in terms of processing power, memory, and may allow a larger window for review of recent voice database entries, when compared to a self-contained system such as is depicted in FIG. 2a, where memory and/or power may be limited to what can be provided in the local environment by the vehicle, vessel, or craft the system 1 is associated with. In another embodiment, the rolling window may be defined by the number of messages logged to the system on either a specific frequency, or band of frequencies. In still another embodiment, the rolling window may be adjusted to capture a defined number of the most recent voices detected and stored in the Recent Voice Database 162, such as by defining the window to include the most recent 20 voices, the most recent 100 voices, the most recent 5000 voices. As before, a larger window for review of similarities in voice attributes would require greater processing power, and storage, with cloud-based systems likely allowing larger windows, as these would be expected to have greater access to higher processing and storage capabilities, but it is recognized that the shipboard system may provide comparable processing capabilities, without requiring cloud access. Along with the analyzed characteristics of the voice, the specific entity (e.g. vessel, craft, vehicle) to which the voice entry from the Recent Voice Database 162 is assigned to be associated with by the system 1, 1' may also be stored in any suitable memory or database, such as the Recent Voice database 162, or within other memory storage for the system 1. Thus, when the system detects a new transmission as being received, the voice characteristics are computed, assigned a fingerprint value, and can then be compared to the entries in the Recent Voice Database 162 using any suitable metric for evaluating similarities of voice characteristics. In an embodiment, the system may analyze a similarity metric such as Euclidean distance, or cosine similarity, as will be familiar to those of skill in the art, and a similarity threshold is applied. In this manner, the messages having voices or characteristics that are most similar to a previously identified voice can be determined, and likely anticipate the associated vessel as being of the same identity as the vessel associated with the instant message, owing the similarity of voice characteristics. If only a single candidate remains, after applying this analysis, the algorithm completes with the single determined transmitter. If multiple candidates remain or no candidates remain following the performance of all of the analysis steps for the Transmitter Determination submodule 172, the algorithm ends, and analysis of the message by the Transmitter Determination sub-module terminates with the transmitter undetermined and identified within the system as an unknown entity. If multiple candidate transmitters are remaining on the list, the system may similarly terminate analysis with the broadcast message being associated as an unknown entity, and may optionally tag the message entry in the database, and/or provide an alert associated with the transmission, noting the uncertainty as to the determination of the transmitter, and optionally provide a listing of possible transmitters for evaluation by a human operator, all of which may be preserved by logging in the database 200, 230.

Recipient Determination Submodule

Figure 5:
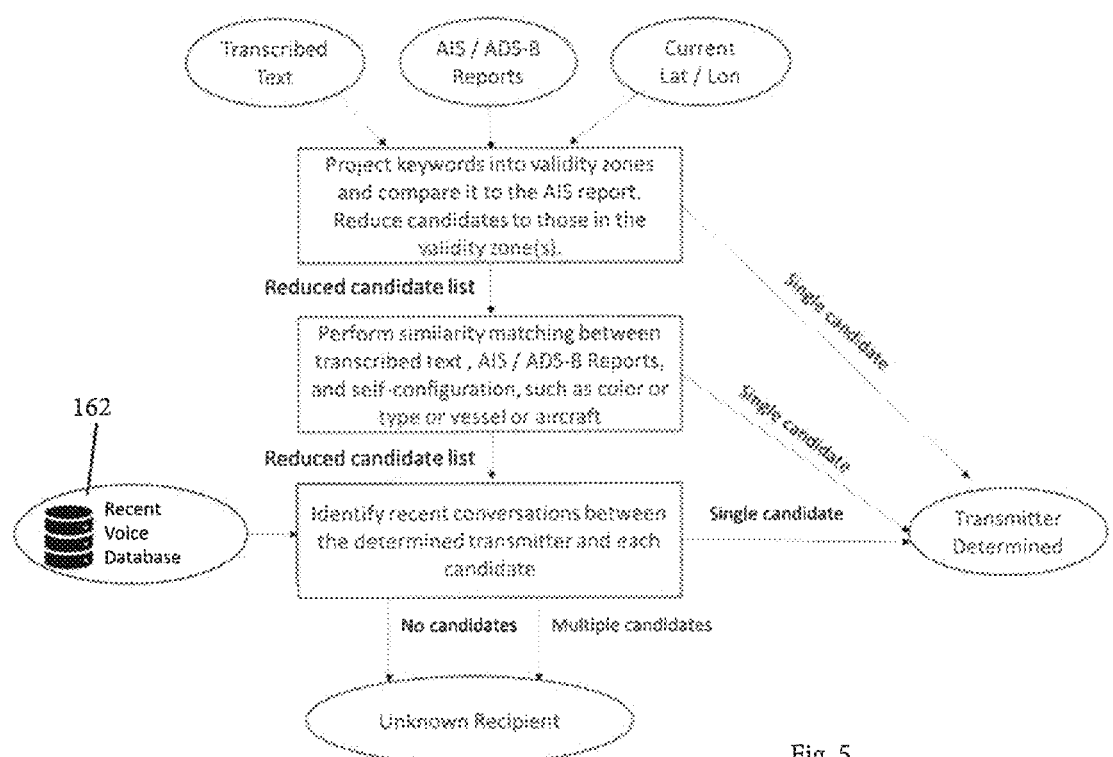
FIG. 5 is an exemplary process flow for the performance of the algorithm for identifying the intended recipient of a transmission, according to an exemplary embodiment of the invention.

Determining the intended recipient of a transmission is import for several reasons. Mariners or aircraft pilots may not be interested in most voice chatter but want to be alerted when another entity is hailing them. For emergency services, such as Coast Guards, it is critical for those services to be aware of when a boater is hailing them. For applications in unmanned vehicles, having a high confidence when a transmission is addressed to the unmanned vehicle is important so that the device does not abruptly respond to any or all radio traffic it ingests, rather it is important that the unmanned vehicle respond only to those messages that were intended for it, in order to avoid confusion between nearby vessels. The determination of the intended recipient of a transmission may be performed by a multi-step algorithm shown in FIG. 5. In an embodiment, the Recipient Determination submodule 174 may be capable of recognizing that the message has an intended audience of a group of vessels, and thus, it may be the case that the monitored vessel is just one intended recipient of a message, amongst a group or class of intended recipients (e.g. vessels in the area of a given geographic location or landmark, such as may occur where the message is a small craft advisory, raising concerns of possible weather conditions, as an example.

In an embodiment, the Recipient Determination submodule 174 ingests message associated information including the transcribed text, any transponder beacon information as decoded by the AIS or ADS-B decoder 122, and the current position information (e.g. latitude/longitude) for the transmitter, as may be determined from any source capable of providing the location information, including the transponder beacon information, or through a determination by the transmitter determination sub-module described above. In an embodiment, the algorithm for the Recipient Determination submodule 174 may be provided detailed location information of the transmitter, whether determined by information contained directly within the text of the message received, as determined by beacon transponder information, or as determined by the system 1, with or without the use of a Radio Direction Finder 90, whereupon the algorithm for the Recipient Determination submodule 174 would seek to determine the intended recipient by projecting a validity zone outwards from each of the candidate recipients around the transmitter, with the validity zone guided by directionality keywords, as described above, looking for keywords such as "port", "starboard", "north", and "south", or any other suitable direction words that may indicate the targeted recipient vessel for a message, and identifying possible candidate intended recipients where the projected validity zone for that candidate recipient can possibly be classified as "true", that is the message and the projected validity zone for a candidate recipient are not necessarily in conflict with each other.

As a non-limiting example, in an instance where the received transmission is transcribed by the transcription service module 150 to read: " . . . this is the vessel to your port . . . " the algorithm for the Recipient Determination submodule 174 would generate an array of all possible recipient candidates positioned nearby the monitored vessel and generate a validity zone to each candidate's port side. If the previously determined transmitter location is determined to fall in a region that would make that candidate's validity zone "true", then that recipient candidate may be deemed to have a validity zone that is compatible with being an intended recipient, and therefore that particular candidate would remain eligible to be included in the candidate list. However, if the validity zone for a particular candidate is incompatible with encompassing the location of the transmitter, then it must follow that particular candidate cannot be an intended recipient for the message, and therefore that particular candidate recipient would be removed from further consideration as an intended recipient, and would be removed from the listing of possible candidates. If, after this initial assessment, only a single candidate recipient remains, the algorithm completes with the single determined recipient identified as the only possible recipient.

Should there be a need to even further reduce the list of candidate recipients output from the preceding determination, the algorithm for the Recipient Determination submodule 174 then reviews the text string for the received transmission, as transcribed by the transcription service module 150, and compares the text context against vessel or aircraft identifiers, including names, call signs, or tail numbers as may be reported in the AIS/ADS-B reports, along with identification configurations set on the device. These identification details include the vessel's name, the aircraft tail number, the type or color of the vessel or aircraft. As described above, a comparison is then performed by computing the similarity, for example, the Levenshtein distance, between the words in the transmission, and details reported by AIS/ADS-B, and the device self-configuration details. In an exemplary application, a user of this device may enter that this device resides on a red tanker vessel. If a transmission is received that says, "red tanker, red tanker do you read me?" the device will assess a high similarity score and indicate that the transmission is meant for the vessel on which it is operating. In this manner, the algorithm for the Recipient Determination submodule 174 may assess for each candidate recipient if the similarities between the text message, and the reviewed candidate recipient's information align, such that a candidate remains a possible intended recipient for the particular transmission being analyzed. If only a single candidate remains after this assessment, the algorithm to determine the intended recipient of the message completes with the single determined recipient.

Should there be a need to still further reduce the list of candidate recipients output from the preceding determination, the algorithm for the Recipient Determination submodule 174 then analyzes recent transmissions between the known transmitter and each candidate recipient, in order to determine if the intended recipient, from the candidate recipient list, can be positively identified. In an embodiment, the algorithm for the Recipient Determination submodule 174 will assess recent transmissions between the determined transmitter and each candidate recipient. The system may recognize context clues that indicate there has been a continuing plurality of radio communications between a recipient (having the same identity as a candidate recipient for the message being reviewed) and the transmitting entity, and when assessed in the context of those earlier transmissions, it is possible to identify the intended recipient from the earlier messages. In an embodiment, the assessment of the intended recipient may follow a similar process and analysis as applied through the algorithm for determining the transmitter of a transmission, substituting an intended recipient for the candidate transmitter when analyzing the similarities with recent voice fingerprints as accessed from the Recent Voice database 162. In an embodiment, the system may perform a voice analysis, as described previously, in order to associate a particular voice characteristic with an earlier message that may contain identification language, that can then assign an entity or vessel location to a recognized voice characteristic, and thereby reduce the number of candidate recipients remaining on the list. If, after performing the analysis through the algorithm for the Recipient Determination submodule 174, there exists only one candidate falling within a recent voice analysis threshold, the algorithm completes with the single determined recipient identified. If no candidates remain or multiple candidates remain, the algorithm exits with the recipient undetermined. If multiple candidates remain, the system may optionally indicate or flag the message as being uncertain as to the intended recipient, and may provide a list of possible recipients associated with the message that can be reviewed by a human operator, or preserve the information in the log entry of the database 200, 230 associated with the message.

Transmission Type Determination Service Submodule

Determining the intent of a particular transmission is often challenging because humans use many different words to convey the same meanings. For instance, a boater may initiate a hail with "red ship, do you read me?" or "come in Atlantis." Both communications are different sets of words, but they convey the same intent—to hail another vessel. The Transmission Type Determination Service submodule 176 for the NLP Service module 170 may utilize a Machine Learning text classifier algorithm running on a processor 10 performing the computations and subroutines necessary for the Transmission Type Determination Service submodule 176 to be able to assess the intent or category of any given transmission that is captured through the transcription service module 150, and optionally translated by the Translation service module 160 where the original language of the monitored transmission is different than that in which the system 1 is trained.

In an embodiment, the device uses a training system providing a fine-tuned Large Language Model (LLM) to allow an artificial intelligence program, and the system can use the training through the LLM to provide machine-based text classifier algorithm for the analysis by the Transmission Type Determination Service submodule 176. In another embodiment, training data for the training model is generated based on simulated or virtual messages, as may be exchanged in a simulated or virtual environment. The training data may then be used to train the Large Language model, with the application for use in real-world autonomous communication applications. The virtual environment may be generated and/or rendered from the viewpoint of one or more vessels, crafts, or vehicles operating within the virtual environment. In some implementations, the training data may be updated with real-world data such that the training datasets include both simulated data and real-world data. The training system can therefore utilize one or more servers 230, 200 and optionally, access data stores, such as Recent Voice Database 162 and may use a cloud-based deep learning infrastructure with artificial intelligence to analyze the sensor data received from the system 1, 1' and/or stored in the data storage for the recent voice database 162, or stored in any suitable memory, such as databases for servers 230, 200. The training system can also incorporate or train up-to-date, real-time neural networks, as previously described (and/or other machine learning models) for one or more training models.

In a particular embodiment, prior to processing live data, the Transmission Type Determination Service submodule 176 is provided with a corpus of example transmissions (the training set). The information for the training set may be collected data from various sensors providing information to the system (e.g., at least radio 80, beacon decoder 122, and optionally direction finder 90) as described herein. For training, information from the system, or the provided data set, are provided to a data store, such as a database, which may be on an accessible server, whether local storage and database 230, or cloud storage and database 200, of FIG. 2*a*. This information can then be provided as model for machine learning processes (e.g., using deep neural networks, and natural language processing) as discussed herein. Iterative training with the data set may occur on the computing device of the device 3, via processor 10 having access to memory that is communicatively coupled to the processor of the device, with the processor receiving information from the local storage and database 230, through communication port 40, whether wired (ethernet) port 44, or wireless communication device 42. Alternatively, the information may be prepared in advance, and simulate the nature of the information that would be provided by the sensors of the system. Alternatively, training may rely on a cloud-based processor, having access to memory storage and database 200. In an embodiment, each example transmission being provided as part of the base model may be assigned a "Transmission Type", as may have been determined by a human reviewer, or as provided by a series of known example transmissions provided in an LLM. The corpus of transmission utilized for training the Transmission Type Determination Service submodule 176 would include different exemplary phraseologies that are largely representative of the radio communications found in the real world, and expressing the various intents for which the messages are to be classified into. The transmission types, i.e., various categories for binning the transmissions, may vary depending on the domain for which the system is applied, as each of marine, aircraft, or vehicle ground traffic may have several different categories of intents, and further may overlap in some intents. For the purposes of providing a working example, the following embodiment will discuss a marine application, though one skilled in the art will recognize that modifications to the nature of the categories for a specific domain may be necessary and will be understood as to how to assign various transmissions into respective categories relevant to a particular application (e.g., aircraft, vehicles, etc.).

FIG. 6 depicts a block diagram of an example process for training the classification algorithm for the Transmission Type Determination Service submodule 176. The training can be performed in either a supervised or unsupervised manner. The training may involve a deep neural network, using the training set of exemplary transmissions, with the training of the deep neural network being performed in a manner familiar to those of skill in the art. The Transmission Type Determination Service submodule 176 utilizes algorithm and performs calculations on components of the system, including at least the processor 10 and associated memory of the system 1, and is communicatively coupled to the one or more data sources for the system, including radio 80, AIS and ADS-B decoder 122, optional direction finder 90, and accesses stored memory components including local and cloud storage and databases 230, 200, as have been described previously.

As shown in FIG. 6, training is initially provided in the form of a base model, for example, by pre-training using a deep belief network, in a particular embodiment. Supervised learning uses a training set to teach models to yield the desired output. The training dataset includes inputs and desired outputs, which allow the model to learn over time, or when the training dataset includes input having known output and the output of the neural network is manually graded. The network processes the inputs and compares the resulting outputs against a set of expected or desired outputs. Errors are then propagated back through the system. The training framework can adjust to change the weights that control the untrained neural network. The training framework can provide tools to monitor how well the untrained neural network is converging towards a model suitable for generating correct answers based on known input data. The training process repeatedly occurs as the network weights are adjusted to refine the output generated by the neural network. The training process can continue until the neural network reaches a statistically desired accuracy associated with a trained neural network. The trained neural network can then be deployed to implement any number of machine learning operations to output a result.

Supervised learning is typically separated into two types of problems—classification and regression. Classification uses an algorithm to assign test data accurately into specific categories. Regression is used to understand the relationship between dependent and independent variables. Numerous different algorithms and computation techniques can be used in supervised machine learning, including but not limited to, neural networks, naïve bayes, linear regression, logistic regression, support vector machines (SVM), k-nearest neighbor, and random forest.

Unsupervised learning is a learning method in which the network uses algorithms to analyze and cluster unlabeled data. These algorithms discover hidden patterns or data groupings. Therefore, the training dataset includes input data without any associated output data. The untrained neural network can learn groupings within the unlabeled input and determine how individual inputs relate to the overall dataset. Unsupervised training can be used to for three main tasks-clustering, association, and dimensionality. Clustering is a data mining technique that groups unlabeled data based on similarities and differences. This technique is often used to process raw, unclassified data objects into groups represented by structures or patterns in the information. Association is a rule-based method for finding relationships between variables in a given dataset. This method is often used for market basket analysis. Dimensionality reduction is used when a given dataset's number of features (dimensions) is too high. This technique is commonly used in the preprocessing of data.

Variations of supervised and unsupervised training may also be employed. Semi-supervised learning is a technique in which the training dataset includes a mix of labeled and unlabeled data of the same distribution. Incremental learning is a variant of supervised learning in which input data is continuously used to train the model further. Incremental learning enables the trained neural network to adapt to the new data without forgetting the knowledge instilled within the network during initial training.

In an exemplary marine application, the various "Transmission Types" may be categorized as "emergency", "navigational hazard", or "hailing request", "Radio Channel Change", as exemplary categories of transmission types, or intents. One skilled in the art will recognize that other categories of transmission types are possible and can be recognized through the processing of data entries according to the teachings here, with the inclusion of additional category types still falling within the spirit of the teachings herein. With reference to FIG. 6, the base model is initially provided for training the transmission type classifier for the intent submodule 176. During the fine-tuning process, an open-source LLM, referred to as the base model, is trained as shown in FIG. 6. The process for training the model thus requires the output of the base model 300 to be compared to the expected Transmission Type 320 (by comparing the estimated transmission type from the base model, compared to the historical transmission dataset 310) using a computed loss-function 330 that quantifies how far the predicted Transmission Type (the labels for each transmission 340) is from the expected Transmission Type 320. A typical loss-function 330 for this process is cross-entropy loss. The values within the base model are then adjusted to minimize the cross-entropy loss, providing an interim updated model 350. The process repeats, as training the model relies upon repeating for thousands of iterations, until the cross-entropy loss is below a set threshold or adjusting the model's values does not result in a lower cross-entropy loss. At this point, the training process exits, and the latest set of adjusted values becomes the fine-tuned model 360. When the device receives a new transmission and that transmission is ingested into the NLP service module 170, the transcribed text as prepared by the transcription service module 150 is input into the fine-tuned model, whereupon the fine-tuned model 360 generates the appropriate transmission type, based on the best trained model 350 available at that time.

Position Extractor Submodule

In an embodiment, the system may extract position information from transcribed text. In an exemplary application of the invention, should a vessel or aircraft request emergency assistance, a system 1 configured to automatically extract coordinates can help, such information may aid in the efficiency with which search and rescue efforts may more easily locate the aircraft or vessel. This system 1 may also be used for information such as a navigational hazard like a floating debris pile, a vessel that has run aground or a man overboard. Alternatively, there may be a benefit in understanding the circumstances or situational awareness if positional information is automatically extracted from incoming messages, such that the positional information can be presented, or emphasized to a user, or provided to a display.

In an embodiment, the Position Extractor submodule 178 converts relevant parts of the transcribed text into latitude and longitude coordinates that can then be displayed to a communicatively connected display, such as an ECDIS display, other chart plotting displays, and/or a mobile or web application, such as can be presented to a user's personal device 100. In the maritime space, Coast Guards often transmit these alerts via a notice to mariners on marine VHF radio. Typically, mariners make a mental note of the position described in the transmission or may manually insert a hazard by typing in the location on a chart plotter display. In an exemplary embodiment of the device 3 described herein, the system 1 may automate the process for presenting hazard or positional information to a display. In an exemplary application, a broadcast Notice to Mariners that is received will be reviewed by the system for position information, and any relevant information from the message is extracted by the system then caused to be shown on relevant displays, thereby avoiding the need for a user to remember exact details of the notice or for a user to manually enter the information from the notice into a chart plotter.

An exemplary flow path of the operation of the position extractor submodule 178 is depicted in FIG. 7. The algorithm for the Position Extractor submodule may be performed by the processor 10 of the device 3, or alternatively may be performed by any processor associated with the system, including processors associated with locally served application 232, accessing the memory of the local storage and database 230 of FIG. 2a, or the cloud-based application 202, accessing the memory of the cloud storage and database 200 of FIGS. 2a, 2b, or on any other processor associated with the system 1, and may further utilize any information extracted from the message or additional data associated with the message, e.g. from additional sensors, such as beacon decoder 122, or direction finder 90, if present. In an exemplary embodiment, the processor 10 ingests the transcribed text of the message, and using NLP, and automatic speech recognition processing as previously described, the system 1 will scan the text of the recognized speech, and using NLP processing, the system may identify the information in the message or specific words that represent numbers, called "number words". This set of number words is predefined in a configuration file, though it is contemplated that through ongoing use of the device, the set of number words may be increased as machine learning occurs, and the system can recognize additional number words that should be added to the set (in a manner utilizing machine learning as previously described). In an exemplary embodiment, where a number word is found in a message, the algorithm continues to scan the text as normally viewed (e.g., left to right) to find additional number words and enters the number words, in order as they appear, into an array. Next, each word is mapped into its representative value. In this manner, "forty six" and "four six" both become the integer value "46". Next, the algorithm runs a regular expression replacement on remaining elements in the array, replacing words that represent decimals (e.g. "dot", "point") and words that represent direction (e.g. "North", "South"). Finally, the array is concatenated and a coordinate, is produced that can be ingested by chart plotters and other visualization devices. Additionally, in a particular embodiment, the content from the message is extracted as previously described, and the meaning or impact of the message is interpreted, for example, using machine learning as described above, in order to identify the subject of the message. For example, the term "debris field" from FIG. 7 may be extracted from the message using the teachings herein, such that the plotted coordinate, when caused to be displayed, may further be labelled with the subject associated with the identified point on the chart, such that a reviewer can quickly identify both the location, and the reason for the plotted coordinate.

In use of an exemplary application of any embodiment of the device 3 described herein, as provided a component of a system 1, 1', the device 3 may be provided on a representative craft, vehicle or vessel. With reference to FIG. 12 there is depicted an exemplary stepwise process for the system to receive a message and ingest the contents, determine the impact or meaning of the message and the identity of the transmitter and intended recipient, preserve the message to a log and present to a user, optionally providing an alert if warranted, and present a response message that may be generated by the system, or alternatively provided by the user.

As shown in FIG. 12, an embodiment of the device 3 as previously described, is provided for use with a marine vessel, navigating amongst other marine traffic. Referring to step 1201, the device may detect an incoming radio transmission from another vessel as the initial transmitter, with the transmission being received by the radio 80, which may be an SDR, as depicted in step 1201. The radio may be monitoring a designated frequency, or may be scanning multiple frequencies, and detecting if there is a message on a particular frequency, when comparing the signal to noise ratio for that frequency, as has been discussed. In an embodiment, the radio 80 may be one of several radios (e.g. SDRs)

simultaneously monitoring a wide band of frequencies. In an exemplary embodiment, each SDR may provide their broadcast stream through a software defined radio module 120 and may identify incoming broadcast transmissions through the signal to noise service module 130, as described herein, for capture by a listener software module.

Following the teachings herein, the incoming message may be captured from the radio, as an audio data file, in step 1202. The contents of the audio data file may be recognized as spoken word, and may then be converted into text, e.g. text string, by operation of the transcription module 150, as shown in step 1203. The transcription may utilize artificial intelligence through the speech recognition and conversion to text as described herein. If the language of the original audio transmission is in a different language than that utilized by the system, e.g., as preferred by the user, then the system may further prepare a translation of the foreign language message into the language employed by the system, through operation of the translation module 160. In an embodiment, the translation is performed on the recognized text string output from the transcription module 150.

In step 1204, the system applies machine learning techniques as taught herein, including NLP processing and deep neural network processing for determining the intention of the message, and classifies the message into an intent category from among a listing of intent categories 1205 defined by the system.

As shown in step 1206, the system 1 may extract relevant information from the recognized text, including positional language, and contextual information about the nature of the message, such as transponder beacon information from the beacon decoder 122, and optional direction finder 90, or derived information from the contents of the message as transcribed in the text string.

The system 1, in step 1207, may then process the ingested information and contextual information to assign the identity of the transmitter, and the intended recipient.

In step 1208, the system 1 may preserve the received message, contents and relevant information, to a log, whether stored in memory locally or remotely, such as to a database. Furthermore, the system may present the logged message information to a graphical user interface, such that the user may select and playback the particular message from amongst a listing of received messages. The system may highlight messages to the user, for example, those that are intended to the user's vessel, such as a hail, or a question, in order to make it easier for the user to recognize messages directed to that vessel from amongst all of the radio messages logged. The display may be an integrated component of the device 3, or may be an external monitor 60 operatively connected to the device. Still further, the display may be a user's personal device 100, accessing the logged information through an application whether a locally served application 232, or a cloud-based application 202, that facilitates communication between the user's device 100, or a reviewer's device 100, and the logged information in the storage database 230, 200.

Furthermore, should the system identify that the message is applicable to the monitored vessel, the system may trigger an alert to the user or reviewer, such as a message, detectable alert, or an alarm sounding through speaker 70. This alert may bring the message to the users attention with particularity, such as where the monitored vessel is being hailed, or a response is determined as being necessary.

In step 1210, the response message may be transmitted through radio 80, whether the response is generated through the system 1, as an automated response, or by the user directing a response to be transmitted, such as through operation of the radio, as will be familiar to those of skill in the art. In an embodiment, the system may prepare one or more suggested responses, for selection by a user/reviewer, or alternatively, the system may autonomously generate and transmit a response that is appropriate in view of the contents of the received message, the context information, and in view of the mission of the vessel. In an embodiment, the outgoing message may be converted from text into speech, such as may be known to those of skill in the art, and if needed, the message may be translated into a different language, such as the language of the originally received message, such as through operation of the translation module 160.

Graphical User Interface

Aspects of the graphical user interface for the system 1 are described with reference to FIGS. 13-22. The graphical user interface (GUI) may be part of the software for the system, operating on a processor 10 for a computer having memory, such as may be provided within the enclosure 5 of the device 3, or alternatively may be associated with a computer, having memory and a processor for a personal user device 100, for example, a cell phone or tablet operating in either or both of a cloud environment 210, or in a local environment 220. Alternatively, the processor 10 providing the instructions to prepare a remote display for the GUI may be associated with a computer having a processor and memory and display for remote computer, such as may be employed by a user/reviewer accessing computer or personal user device 100 located remotely, and able to access information from the system via the cloud environment 210. The software for the computer may be a series of code routines and subroutines, and processing results in instructions directing the operating system to perform a series of algorithms and calculations and generate a display interface configured to be presented to a display or monitor 60 operatively connected with, or integrated into the device 3. Similarly, the GUI may be presented to a display of a user's personal device 100, whether locally, or in a cloud environment 220, 210, or presented to a display monitor for a computer associated with one of the locally served application, or a cloud-based application (the locally connected device 100 or the internet connected device 100).

In this manner, the GUI associated with the device 3 may be delivered in any suitable computer configuration, and in multiple formats including at least a mobile application, a desktop application, and browser-based applications, as will be familiar to those of skill in the art. Each GUI (mobile, desktop, browser-based) variant may contain common visual elements that express the device's transcription, translation, and NLP extracted output to a user, and as depicted in the exemplary figures representing screenshots of the GUI on a display, provided below.

In an embodiment, the system processor 10 or a processor associated with either of a locally served application 232, or a cloud-based application 202 may communicate with, and present information to a client. The client is defined as the one or more of a user's personal user device 100, for example a mobile phone, tablet, laptop, or desktop on which the GUI is displayed. Alternatively, the client may be a locally or internet connected device (e.g., computer) that accesses information from the system processor 10, or as provided by the locally served application 232, or the cloud-based application 202.

The associated GUI for the system, as may be caused to be displayed on a client display (e.g. monitor 60, or computer screen for a personal user device 100) is capable of presenting output when the client is connected to the cloud-based environment 210 and/or if the client is connected in a local device environment 220 to the device 3 of interest through any suitable communication protocol, including, but not limited to connection via Wi-Fi, Ethernet, or Bluetooth. In this manner, the system may ensure that a user on a personal user device 100 may still be presented a visual output, e.g., GUI, whether they are connected though an internet access method, or through a local connection method. The system providing a local device environment, such as the described arrangement depicted in FIG. 2*a*, is useful for example, where a vessel or aircraft is in a remote location, unable to connect to the internet, or if the device is operating in an enclaved network environment that does not connect to the internet. The reverse is also true, such that a client that is not connected to the local device, but does have an internet connection, e.g., operating in a cloud-based environment such as that depicted in FIG. 2*b*, may also view outputs from the device 3. This may be useful for fleet managers as users or reviewers, who wish to see transcripts from a distributed fleet of vehicles, each having a device 3 associated with the system, as will be discussed below.

Figure 13:
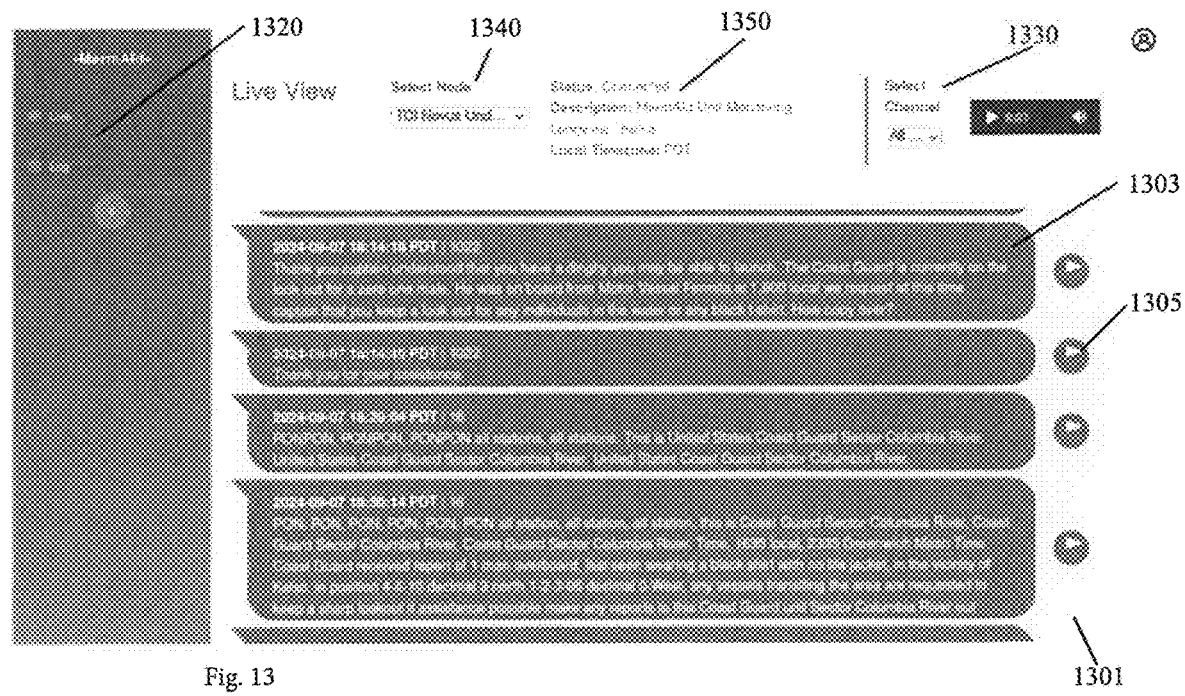
FIG. 13-22 are representative screenshots of the graphical user interface for the system, each according to an exemplary embodiment of the invention.

In an exemplary application of the teachings herein, provided within the associated GUI, the live transcription and translation may be made available for review by a user/reviewer, as shown in FIG. 13 depicting a transmission display module 1301, depicting at least one recent transmission in a transmission entry module 1303. Each transmission entry module would contain the text content for each transmission, which may be user selectably presented in the original language, if different from the displayed language. For each transmission entry, corresponding metadata and contextual information, such as the received channel, received time, transmitter, and recipient, may also be presented, for example at the top of each entry there is provided a time stamp, and channel. It is further contemplated that additional information, such as a bearing to the transmitter, if available, may also be displayed, for the embodiment of the system having a radio direction finder. Transcriptions, as output from the transcription service module 150, and optionally translation service module 160, are paired with a replay button module 1305, selection of which allows a user to replay the audio portion of the broadcast message as received, and/or selection of which may initiate the system to download the corresponding audio clip for a given transmission, and direct the download to a destination accessible by the user/review. Additionally, the display may further provide a live/log selection module 1320, whereby the user can alternately elect to see the most recent transmissions displayed within the transmission display module 1301, or alternatively, provide a reviewable log of received transmissions, which may be sorted by identify information including intended recipient, transmitter, or intent classification or alert triggering transmissions, using user selectable sorting and filtering techniques as are familiar to those of skill in the art. For example, a select channel module 1330 may be provided, featuring a drop down for the channels/frequencies monitored. As depicted in FIG. 13, the display may include a header module 1350, featuring header content for the system being monitored, the header module may provide the status, title or description of the particular system, and identify the local time zone for the vessel associated with the system. Additionally, there is provided a Node selector module 1340, through which a user may select among any nodes registered with the system 1, and such that a user can select a different node than the current node, and in an embodiment where multiple nodes are provided, each having their respective monitoring system as taught herein. Selection of a different node may be performed by using the dropdown arrow to bring up a listing of available nodes, from which the user may select a node to monitor on the GUI.

Figure 14:
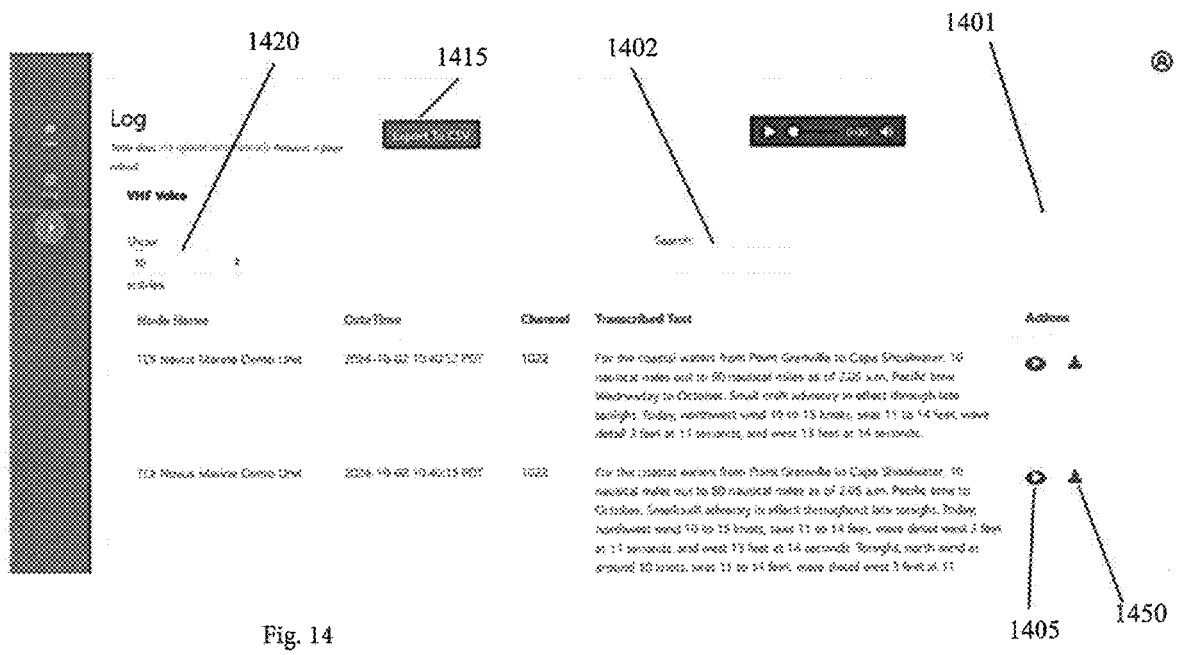

In an exemplary application of the teachings herein, there may be provided within the associated GUI, as depicted in FIG. 14, a log history module 1401 that allows a user to perform several actions: including performing a keyword search, sort log entries by user selectable criteria, and applying a filter across the transmissions to display only those messages that meet defined user selectable criteria. As can be seen with reference to FIG. 14, the data for those logs that are caused to be displayed on the GUI may be provided in a column and row format, and can be easily exported for follow on analysis, such as by being exported and/or downloaded in a. CSV file, or exported in any suitable format as will be familiar to those of skill in the art. As shown, the columns are arranged to display, for each logged message, the name of the node (e.g. device) that captured the message; a time and date stamp for the received transmission, the channel the transmission was received on, the transcribed text, and an actions column. As shown, each entry may include a user selectable replay button module 1405, similar to that described with reference to FIG. 13. Additionally, each entry may be caused to be individually downloaded, by actuation of the user selectable entry download module 1410.

As shown in FIG. 14, the GUI may further provide a search feature that allows a user to enter a search parameter to be located within the contents of the logged message transcripts, for example, the user may cause the system 1 to be search for instance(s) of a defined keyword or phrase occurring within a set of prior transmissions. With reference to FIG. 14, the log history module 1401 provides a search module 1402, that allows a user to enter a text string into the search module 1402 text entry box, whereupon the processor will review the contents of the transcribed messages, identifying and displaying those messages that include the entered keyword or phrase. The text entry may be accomplished using any suitable text entry method, including a keyboard, stylus, mouse, audio dictation and voice recognition, as are known to those of skill in the art.

Additionally, a user may sort the displayed log entries by time, frequency received or other metadata, with such selection for sorting criteria being performed by selecting the column header to cause the entries to be sorted by the parameter defined by the column header, and a second click of the same column header will reverse the order of the sort.

The GUI may further provide an export module 1415, which upon selection by a user, will export the listing of entries that meet the search criteria, such as in an CSV file, for review in another program. Additionally, the GUI may provide a user selectable show entry module 1420, through which a user can use the drop down or enter a value into the text box to assign a number of records that are caused to be displayed. Additionally, it is contemplated that additional columns may be provided within a log history module 1401, such that the user can define which of the data the user wishes to have displayed or provided as part of each logged entry. As is known from databases, the columns may extend horizontally beyond the view provided on the GUI, and using a scroll bar, a user may adjust the view to see additional columns. Similarly, rows may extend beyond those entries displayed on the screen, and a user may scroll through additional rows, using the scroll bar, or through keyboard entries (e.g. arrow selection) in order to review those entries that are not visible on the displayed page, in a manner as is known with current database programs, and will be familiar to those of skill in the art. Thus, it is contemplated that each row would represent a logged transmission, and each column may be a data value that is recorded, or associated with each logged entry, including message data, and contextual data associated with the message, even if not necessarily evident or contained within the audio or text of the message, such as radio direction bearing, intent classification, intended recipient, transmitter, alert status.

Figure 15:
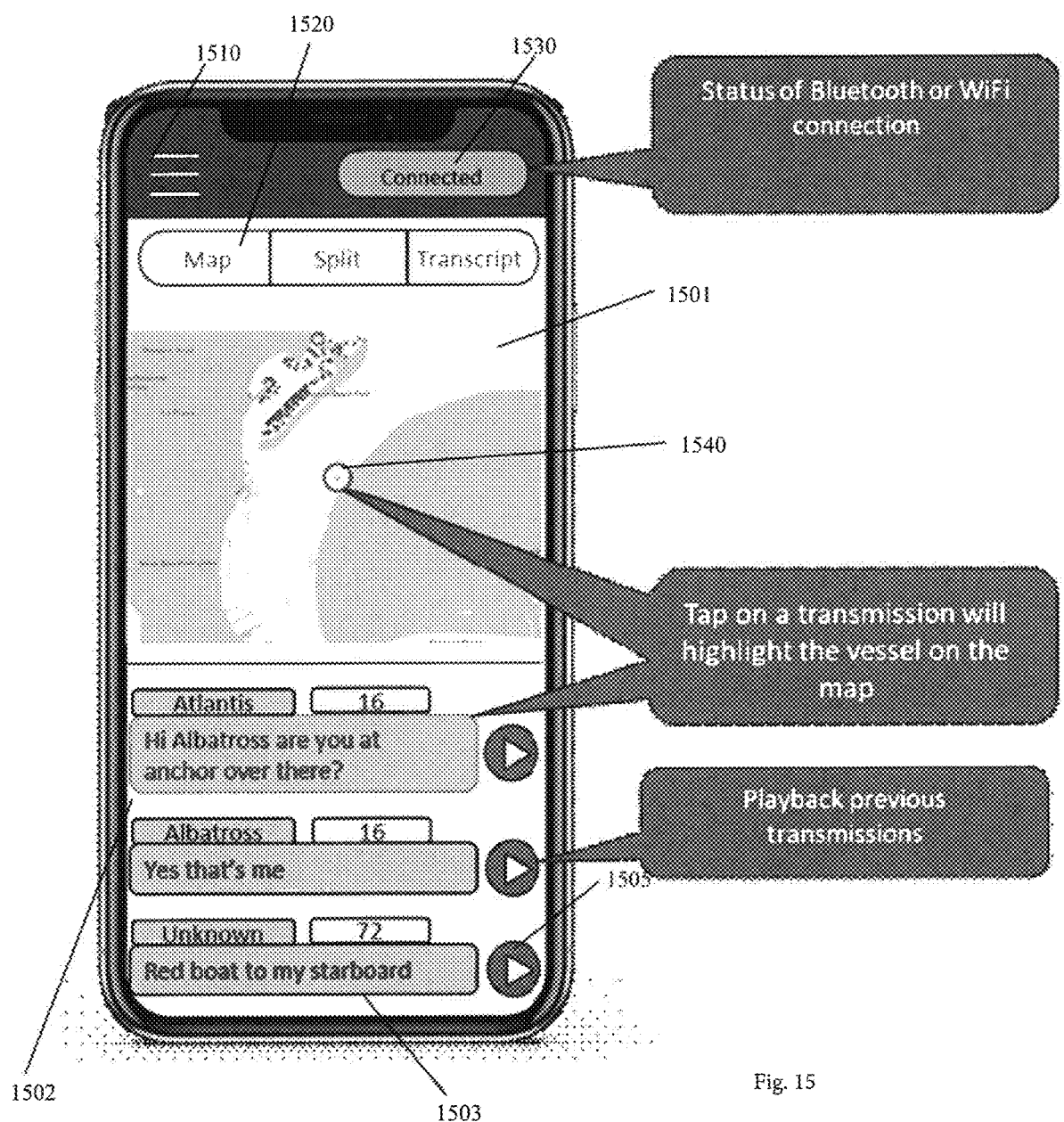

FIGS. 15-18 as depicted include representative data as may be presented on the GUI for a smart phone or tablet, though it is contemplated that similar information could be conveyed to a computer monitor that is not necessarily a mobile device. With reference to FIG. 15, the GUI may include a user selectable live map, where the positions and orientations of entities, such as vessels or aircraft, are shown in the map. The positions of these entities are retrieved from AIS/ADS-B reports. Positions of entities may also be ingested from external systems such as radars. To select the map display, the user may navigate the stylus, or use a finger to press on the menu module 1510, which when selected will bring up user selectable options, including options for revising the display type, or provide a search text box, as has been previously described, within the menu display. As shown in FIG. 15, the display may provide a user selectable display format module 1520, where the user can select to have the GUI display a split screen as depicted in FIG. 15, having both a map module 1501, and a message transcript module 1502. Alternatively, by selecting either "map", or "transcript" from the display format module 1520, the user can select to have the GUI display only a map module over substantially all of the display portion on screen, or by selecting "transcript", the GUI will display only the message transcript module 1502 over substantially all of the display portion on screen. As depicted, a portion of the GUI will display a status module 1530 indicating the connectivity status of the application, and indicating if the connection to the locally served application 232, or the cloud-based application 202 is connected by Bluetooth, or WiFi connection, or alternatively is utilizing cell connection e.g. LTE, 5G, etc.

Within the map display module 1501, markers may be provided, indicating each vessel the system 1 is aware of within the map display. The markers may be populated on screen using any combination of ingested data, including AIS or ADS-B beacon data, radar returns, and plotted transmissions, as detected by the system 1. In an embodiment, where a vessel is actively broadcasting, or a message is being replayed by selection of the replay module 1505, the marker may be highlighted or marked to indicate the marker is associated with the message. For example, as depicted in FIG. 15, the marker 1540 is circled on the map module 1501, thereby alerting the user to the location of the vessel broadcasting the message. As previously described, the message transcript module 1502 will display recent or selected historical messages, with each message entry 1503 including the transcribed message, a vessel identifier (such as the name), and the channel or frequency on which the broadcast was detected.

In this manner, as new transmissions are received and ingested by the system, the map display module 1501 is able to highlight the determined transmitter, directing a user's attention to the transmitting entity, thereby enhancing the user's ability to quickly gain a situational awareness, and allow the user to react more quickly, without the delay of determining the position of the broadcasting vessel.

Figure 16:
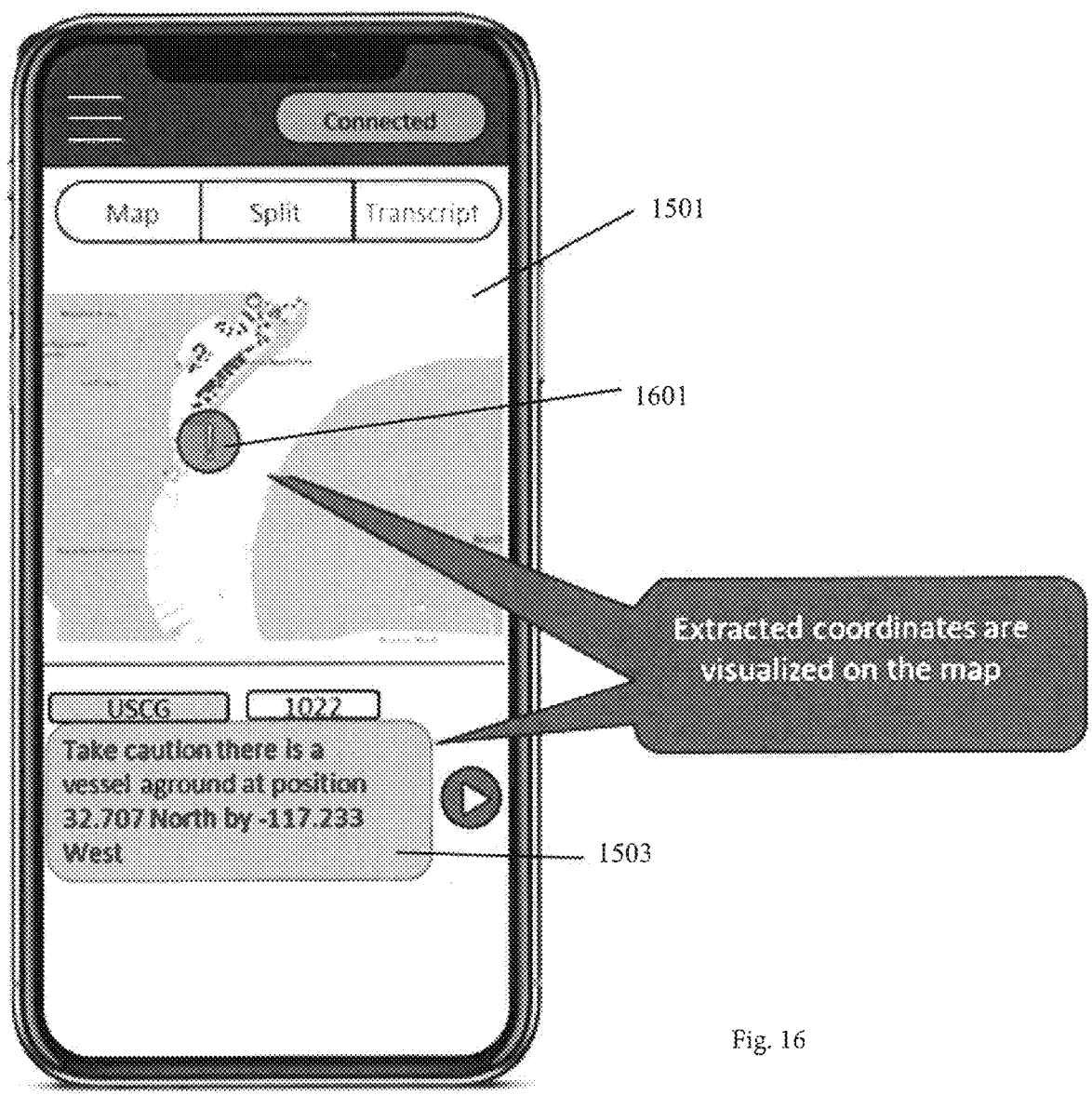

With reference to FIG. 16, the map display module 1501 may further mark the location of hazards or vessels declaring an emergency condition, for example, in an instance where there is a general Notice to Mariners broadcast. As depicted in FIG. 16, the alert position may be indicated by an alert marker 1601, depicted here as a circle with an exclamation point. The position of the alert marker may be extracted from positional information associated with the message, as described previously with reference to the position extractor sub-module 178 of the NPL service module 170. In this manner, the system can present to the user the position of an emergency or navigational hazard without delay and allow the user to relative location of the hazard, and the user's vessel on the map display module 1501, such that the user avoids the need to update a plotter manually, or record the positional information.

Figure 17:
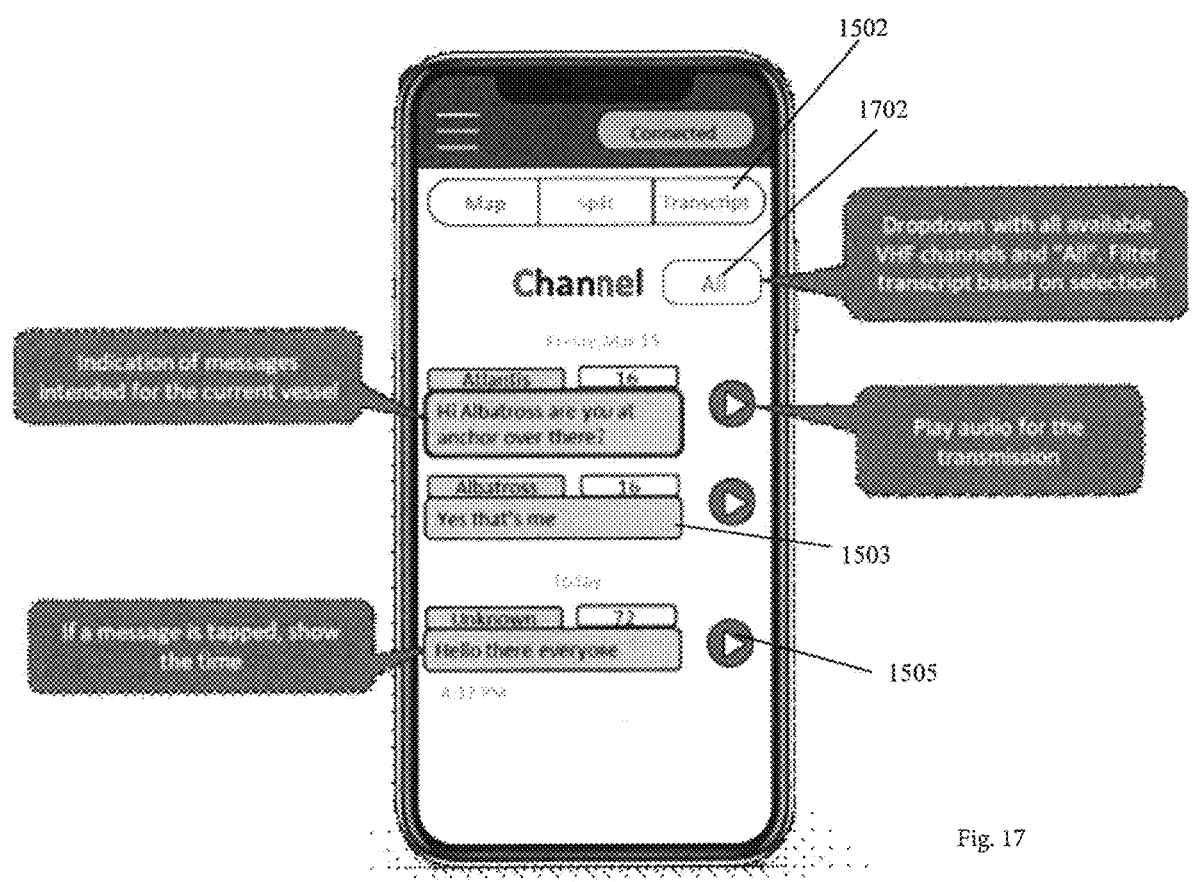

With reference to FIG. 17, there is depicted the GUI presented on a personal user device 100, where the user has activated the message transcript module 1502 and causing the GUI to show a list of messages, and hide information relating to a map display. In an exemplary embodiment, the listing of messages may highlight or provide a marker for those messages that are intended for the monitored vessel associated with the system. As shown, the message may be surrounded by a marker that draws attention the message, such that the user can quickly scan received messages, and identify those that pertain to the user. In an embodiment, selection of a message from amongst the listing of messages may cause the display to reveal extraneous message content, not contained within the transcribed message. As shown, selection of the message, in an embodiment, will bring up the time stamp for receipt of the message. As contemplated previously, each message may be caused to have the audio content replayed, by selection of the replay module 1505. If a user has applied a filter, to narrow the type or content of messages displayed on the message transcript module 1502, the user may remove the filter by selection of the filter toggle module 1702. As depicted, the user may select the filter toggle module 1702, and cause the listing of all messages to be displayed to the message transcript module 1502, such that the user may scroll up or down to review additional messages that do not fit within the limited screen space.

Figure 18:
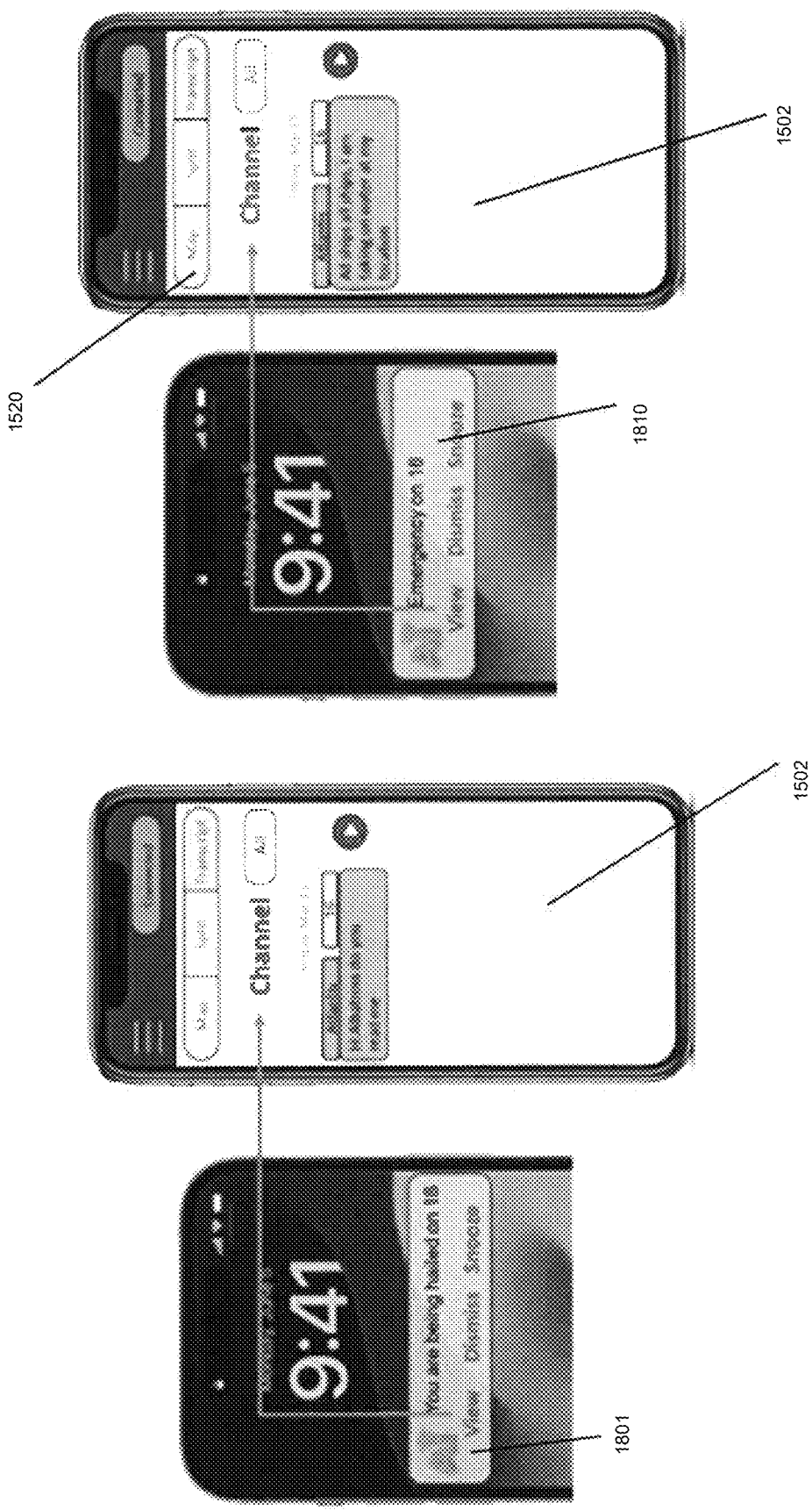

With reference to FIG. 18, the application 232, 210 may direct a notification to be sent to the user's personal device. In an exemplary embodiment, the hailing notification module 1801 may be a notification that can be caused to appear on the personal device lock screen, and may be any suitable notification mode, as will be familiar to those of skill in the art. Ideally, the notification would remain visible on the lock screen until selected by the user, at which point, the GUI display would be presented on the user display, with the subject message displayed, and highlighted in the message transcript module 1502, as previously described. In the case of hailing notification 1801, the notification is to alert the user that the vessel is being hailed, and a response is sought.

For the emergency alert notification module 1810, the notification may behave similarly to the previously described with regard to hailing notification module 1801, only the emergency alert notification module 1810 is caused to be displayed on the lock screen in the instance that the system 1 identifies an emergency broadcast. As before, selection of the notification would cause the GUI to display the emergency broadcast on the message transcript module 1502 of the GUI, with the emergency message being highlighted within the listing of messages, as previously discussed. As before, the user may switch the display mode to include the map by selection of the map, or split button from the display format module 1520, in which case, the marker for the vessel issuing the hailing message or the emergency alert message would be highlighted in map module 1501, as previously discussed.

With reference to FIGS. 19-22, the GUI may provide for a user to establish parameters for which an alert may be triggered, and in an exemplary embodiment, would be caused to have a notification be sent to the user's personal device as discussed above. Alternatively, the trigger alert may be a message sent to the user, or sounding of an alert, or a report to an external reporting service or url to a web service, such as a service that will report alerts when requested.

Figure 19:
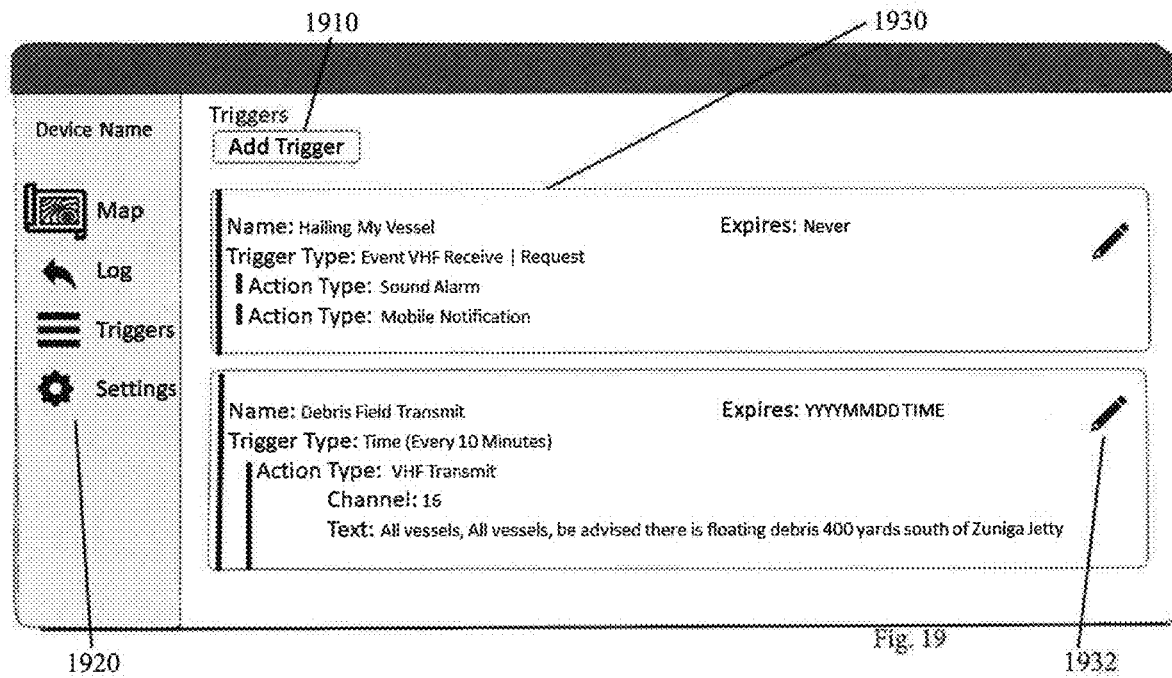

With reference to FIG. 19 there is provided a trigger configuration page that allows a user to review previously defined triggers and associated outcomes, actions for each defined trigger. Each previously defined trigger is displayed within a trigger module 1930. The trigger module may include an edit module 1932, that when selected will allow the user to modify the setting for the selected trigger. Each trigger module 1930 may display relevant information associated with each defined trigger, including the name or category for the defined trigger, such as a hailing event, debris field transmit, or any other category of trigger alerts. The trigger module 1930 may also display the trigger alert type that can include what type of alert is reported to the user. In an embodiment, the alert from the trigger event may be an alert to the user's personal device that a hailing event was detects, as discussed with reference to FIG. 18, and upon such an occurrence, the alert will be triggered and direct a message or an alert to the user. The trigger module 1930 may also provide relevant details for each defined trigger, including the duration of the trigger alert, such as the alert may last only for a user defined duration of time, or alternatively, the alert will continue indefinitely. The trigger module 1930 may also provide information on the action type associated with each defined trigger, where the outcome action when a trigger alert is initiated may be one or more of sounding an alarm, sending a notification to a user's personal device, transmitting a broadcast radio transmission, with the user defining the content of the message, and the channel for the broadcast, and further, the user may define the transmission as occurring only a single transmission, or a repeated transmission, such as an alert repeating every 10 minutes for a navigational hazard. As can be seen with reference to the left side of the GUI, there is a configuration menu module 1920, that allows a user to select between configuration pages identifying user selectable options for "map", "log", "trigger", and "settings", such that the user can navigate to each of these pages to adjust the configurations.

Figure 20:
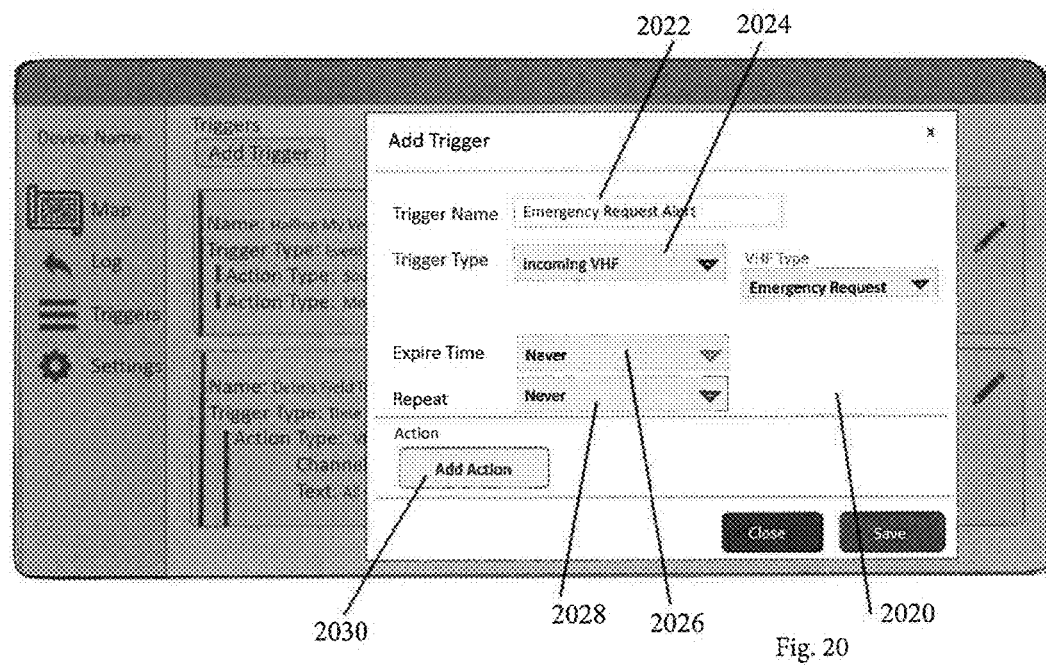

As shown in FIG. 19, the trigger configuration page provides a user selectable add trigger module 1910, and when selected by the user, the GUI will provide to the display a new trigger form module 2020, as can be seen with reference to FIG. 20. Thus, selection of the add trigger module 1910, will initiate the process for the user to add a newly defined trigger and provide options, such as drop-down boxes and text entry boxes, that will allow the user to define the parameters for a newly created trigger event. Through the completion of the user defined parameters of the new trigger form module 2020, the user can set a new trigger to have a user defined name through trigger name module 2022, provided as a text entry box, the defined trigger type (e.g., intent category) for the trigger, which may align with the intent categories from the transmission type determination submodule 176 for the NLP service module 170, as the user may define through the intent type alert module 2024, provided as a drop down box. Additionally, the user may define whether the alert will expire after a user defined period of time or not, through expire time module 2026 provided as a drop down box, and further the user may define whether the alert will repeat periodically, or be a single event, as selected through the repeat module 2028, provided as a drop down box. Within the new trigger form module 2020, there is a user selectable button for the add action submodule 2030.

Figure 21:
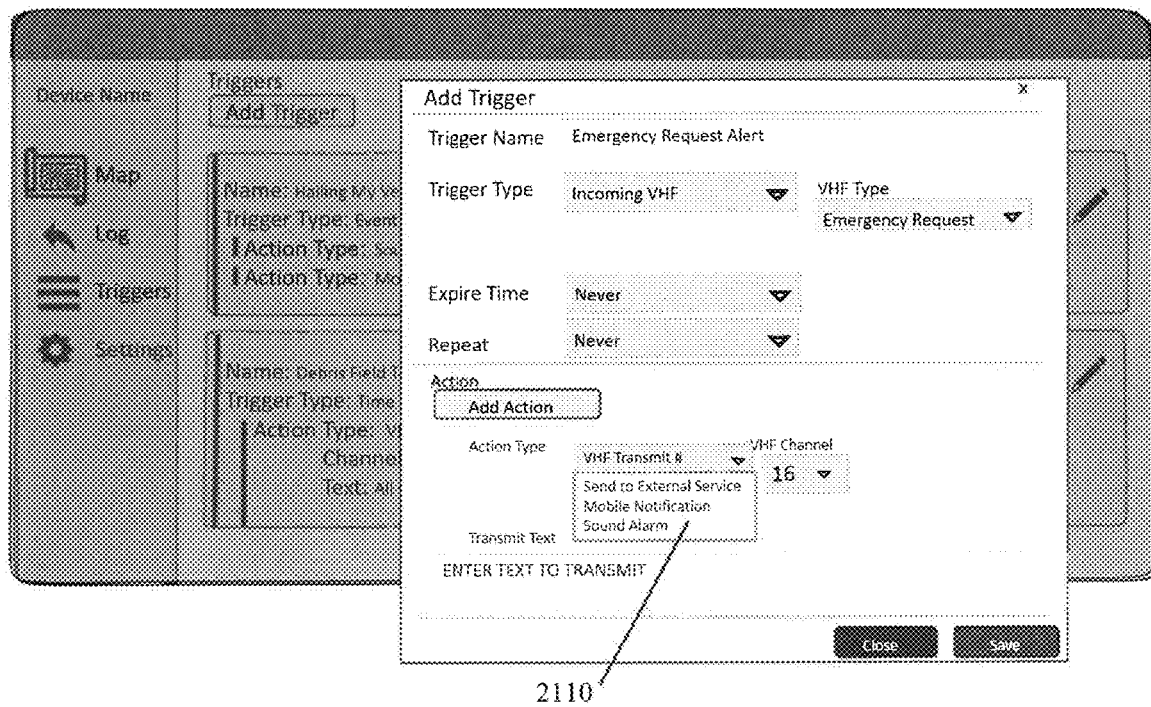

As can be seen with reference to FIG. 21, selection of the add action submodule 2030 from within the new trigger form module 2020, will continue the form within the GUI to allow the user to set parameters for the resulting action for each alert, by bringing up in the GUI display a drop down box in the action selection module 2110 allowing the user to select from various action types for the newly defined trigger, including, for example, one or more of sending a radio transmission by selection of "VHF transmit", where the user can define the contents of the message and the channel for the message broadcast; furthermore, the user may select from the drop down options to have the trigger send an alert response by initiating a mobile notification to the user's personal device 100 (as shown for example, in FIG. 18); the user may set the alert to sound an alarm, such as sounding a speaker or klaxon; and/or send an alert to an external message service.

Figure 22:
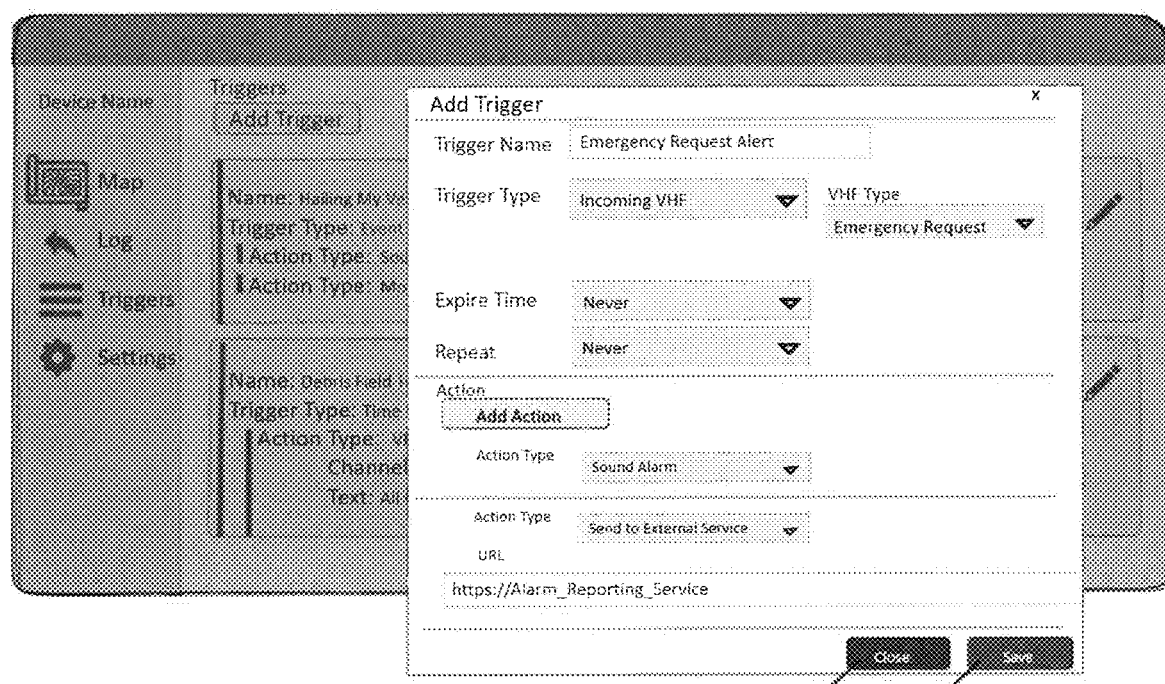

With reference to FIG. 22, the GUI may depict the new trigger form module 2020 with representative user selected parameters set, such that the user may review the defined alert that is to be added. As depicted in FIG. 22, the user has set an alert with an action type of "sound alarm", and a further action type of "send to external service" and defines the URL weblink to where the alert is sent for reporting to the external service. The user may then save the alert as a newly created alert by selection of the save module 2230 and initiating a save action by the system 1, or alternatively, may cancel the addition of the new alert by selection of the cancel module 2220 whereupon the proposed new trigger will be cancelled, and not saved to the system.

Fleet Operations

In fleet application having fleet managers as users or reviewers that can access information from a plurality of devices, e.g., in an embodiment where multiple devices 3 are operational in varied locations, it is contemplated that the multiple devices 3 may cooperatively form a mesh, with each of the devices serving as an input node that is spread out over the geographic area that is encompassed by the plurality of devices 3. It is contemplated that each device may operate autonomously, or semi-autonomously, with each device monitoring the communications picked up by the radio 80 for each device. As described above, each device would be capable of performing all of the actions described herein, in receiving messages, logging the messages, identifying relevant information and intent, and generating an alert if appropriate, and/or assisting with developing a reply, or allowing a user to reply directly. Moreover, it is contemplated that a remote user may be able to access the received transmission log, along with contextual information from each of the multiple devices that are operational, thereby providing a greater area that can be monitored than that monitored by a single device, owing to the limited range of radio transmissions. Where nodes (individual devices 3) are geographically spread out, they may collectively allow a review to monitor radio traffic over a greater area than would be possible with just a single node.

There may be a need to ensure that duplicative message received by multiple nodes are identified as being duplicative. Ideally, received messages that are duplicative would generate identical time stamps, voice fingerprints, or vocal characteristics, and it would be a trivial matter to recognize those messages that contain identical content, and or identical time stamps, such that each can be grouped together to be treated as the same message. However, it is likely that messages that originate from the same broadcast, may be received, and interpreted to be distinct messages by nodes that are geographically separate from each other. For example, this may occur if it may be the case that transmissions detected from remote regions relative to each other may not have identical time stamps, or message content and characteristics, owing to possible interference, e.g., due to radio noise, or static, or varying qualities of transmissions. Therefore, the system incorporating a plurality of nodes may compare messages to identify similarities, and note differences, and perform an algorithm or machine assisted learning to identify and remove duplicative messages. This analysis may incorporate the artificial intelligence teachings with regard to natural language processing, machine learning from applications of neural networks (e.g. DNN), as taught herein. Such a system may review the message contents, identify similar characteristics such as vocal inflections, timing of syllables, or voice fingerprints, and may also identify distinctions in these qualities or characteristics of messages. Furthermore, the system 1 may review each of the messages in view of the collected contextual information, including direction finder information, if available. Just as multiple direction finders may be utilized by one system to triangulate the position of the transmitting entity, similarly, one or more direction finders provided over multiple nodes may also allow triangulation of the source of a transmission, as received by multiple, geographically separate nodes, and thereby allow the identification of a transmitter. Such information may allow a system utilizing multiple nodes to cooperatively compare multiple broadcasts that may be grouped as being the same transmission, even if there are identified distinctions in the message as received, perhaps owing to static, or radio transmission quality affecting each node differently.

A system then utilizing multiple receiving nodes may allow comparison between several versions of the same original broadcast message, though varying in qualities when received by geographically distinct nodes. Once the system has identified a group of messages as relating to the same original broadcast, the system may allow comparison of each iteration of the message as received by each node, and identify the highest quality signal, for example, by utilizing the signal to noise service module, to identify the message with the highest signal to noise ratio, or highest quality signal, which may indicate the highest quality transmission that can then be shared between the plurality of nodes. In this manner, even nodes that are remote from the original broadcast, may be able to be updated with the most accurate transmission log, when the message is fully processed as described herein by the relevant device 3 for the node with the highest quality.

The invention claimed is:

1. A system for processing a radio transmission from a transmitter comprising:
   a device having a housing with at least a processor, memory, speaker, and one or more communication interfaces, at least one radio monitoring a plurality of wavelengths and having a radio output signal, and a power supply;
   the system providing at least a signal to noise service module, a transcription service module, a natural language processing (NLP) service module, and a logging service module, wherein:
      the signal to noise service module is configured to detect variations in a signal to noise ratio for the radio output signal and identify when a transmission is received based on the detected variations in the radio output signal;
      the transcription service module is configured to convert the radio output signal into a text string;
      the NLP service module is configured to perform natural language processing of the text string, evaluate a set of data containing context information, and identify an intent classification for the radio output signal, wherein the NLP service module provides at least a transmitter determination submodule, a recipient determination submodule, a transmission type determination submodule, and a position extractor submodule;
         the transmitter determination submodule is configured to identify the transmitter of the radio transmission;
         the recipient determination submodule is configured to identify the intended recipient of the radio transmission;
         the transmission type determination submodule is configured to apply a text classifier algorithm to identify the intent of the radio transmission; and
         the position extractor submodule is configured to perform an algorithm to analyze the text string, identify positional information within the text string, and provide position output data for plotting on a display for the system;
      the logging service module is configured to direct one or more of the radio output signal, the text string, and the set of data containing context information, to archive as logged entries in a memory storage database.

2. The system of claim 1, wherein the system is configured for simultaneously monitoring and transcribing voice activity on multiple frequencies at once.

3. The system of claim 1, wherein the one or more communication interfaces provides a connection to a network and comprises at least one of a wired connection component and a wireless connection component.

4. The system of claim 1, wherein the device is portable and is communicatively coupled to at least the power supply, a monitor, and an antenna.

5. The system of claim 4, wherein the system further provides a graphical user interface through which a user may review the logged entries.

6. The system of claim 5, wherein the graphical user interface provides a transmission display module configured to display one or more of a listing of logged entries, a map module, and a message transcript module.

7. The system of claim 1, wherein the at least one radio is a plurality of radios.

8. The system of claim 1, wherein the at least one radio includes at least one software-defined radio.

9. The system of claim 1, wherein the device further provides a speaker.

10. The system of claim 1, wherein the system further provides a trigger service module configured to analyze the intent classification provided by the NLP service module, identify an alert condition, and initiate an alert event.

11. The system of claim 10, wherein the alert event is one of sounding an audible alarm, providing a notification to a user personal device, initiating a radio warning broadcast, automated response over radio, and providing an alert to an external service.

12. The system of claim 1, wherein the system further provides a listener software module configured to stream information from a user datagram protocol and record the stream of information to memory as a digital audio file.

13. The system of claim 1, wherein the system further provides a translation service module configured to translate the text string into a different language.

14. The system of claim 4, wherein the system further provides a graphical user interface through which a user may review the logged entries.

15. The system of claim 14, wherein the graphical user interface provides a transmission display module configured to display one or more of a listing of logged entries, a map module, and a message transcript module.

16. A system of monitoring radio transmissions of one or more transmitters over a larger area, the system providing a plurality of devices associated with different carriers and in communication with a network; wherein each device of the plurality of devices serves as a node for the system and comprises a housing with at least a processor, memory, speaker, and one or more communication interfaces, at least one radio monitoring a plurality of wavelengths and having a radio output signal, and a power supply;
the system providing at least a signal to noise service module, a transcription service module, a natural language processing (NLP) service module, and a logging service module, wherein:
the signal to noise service module is configured to detect variations in a signal to noise ratio for the radio output signal and identify when a transmission is received based on the detected variations in the radio output signal;
the transcription service module is configured to convert the radio output signal into a text string;
the NLP service module is configured to perform natural language processing of the text string, evaluate a set of data containing context information, and identify an intent classification for the radio output signal, wherein the NLP service module provides at least a transmitter determination submodule, a recipient determination submodule, a transmission type determination submodule, and a position extractor submodule;
the transmitter determination submodule is configured to identify the transmitter of the radio transmission;
the recipient determination submodule is configured to identify the intended recipient of the radio transmission;
the transmission type determination submodule is configured to apply a text classifier algorithm to identify the intent of the radio transmission; and
the position extractor submodule is configured to perform an algorithm to analyze the text string, identify positional information within the text string, and provide position output data for plotting on a display for the system;
the logging service module is configured to direct one or more of the radio output signal, the text string, and the set of data containing context information, to archive as logged entries in a memory storage database.

17. The system of claim 16, wherein the position extractor submodule is configured to perform an algorithm to analyze the text string and identify positional information within the text string and provide a position output data for plotting on a display for the system.

18. A system of monitoring radio transmissions of one or more transmitters over a larger area, the system providing a plurality of devices associated with different carriers and in communication with a network; wherein each device of the plurality of devices serves as a node for the system and comprises a housing with at least a processor, memory, speaker, and one or more communication interfaces, at least one radio monitoring a plurality of wavelengths and having a radio output signal, and a power supply; the system providing at least a signal to noise service module, a transcription service module, a natural language processing (NLP) service module, and a logging service module, wherein:
the signal to noise service module is configured to detect variations in a signal to noise ratio for the radio output signal and identify when a transmission is received based on the detected variations in the radio output signal;
the transcription service module is configured to convert the radio output signal into a text string;
the NLP service module is configured to perform natural language processing of the text string, evaluate a set of data containing context information, and identify an intent classification for the radio output signal, wherein the NLP service module provides at least a transmitter determination submodule, a recipient determination submodule, a transmission type determination submodule, and a position extractor submodule;
the transmitter determination submodule is configured to identify the transmitter of the radio transmission;
the recipient determination submodule is configured to identify the intended recipient of the radio transmission;
the transmission type determination submodule is configured to apply a text classifier algorithm to identify the intent of the radio transmission; and
the position extractor submodule is configured to perform an algorithm to analyze the text string, identify positional information within the text string, and provide position output data for plotting on a display for the system;
the logging service module is configured to direct one or more of the radio output signal, the text string, and the set of data containing context information, to archive as logged entries in a memory storage database;
wherein each device is portable and is communicatively coupled to at least the power supply, a monitor, and an antenna.

* * * * *